United States Patent
Feadler et al.

(10) Patent No.: US 11,736,776 B2
(45) Date of Patent: *Aug. 22, 2023

(54) MONITORING OPERATING SYSTEM METHODS TO FACILITATE UNOBTRUSIVE DISPLAY OF MEDIA CONTENT ON PORTABLE DEVICES

(71) Applicant: IQzone, Inc., Scottsdale, AZ (US)

(72) Inventors: Matthew Aaron Feadler, Phoenix, AZ (US); James Alex Wolfinger, Scottsdale, AZ (US); Sean Robert Wagner, Ferndale, WA (US)

(73) Assignee: IQzone, Inc., Scottsdale, AZ (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/079,870

(22) Filed: Oct. 26, 2020

(65) Prior Publication Data
US 2021/0127163 A1    Apr. 29, 2021

Related U.S. Application Data

(60) Provisional application No. 62/926,318, filed on Oct. 25, 2019, provisional application No. 62/926,322, (Continued)

(51) Int. Cl.
*H04N 21/81* (2011.01)
*G06F 3/0481* (2022.01)
(Continued)

(52) U.S. Cl.
CPC ......... *H04N 21/812* (2013.01); *G06F 3/0481* (2013.01); *G06F 9/44* (2013.01);
(Continued)

(58) Field of Classification Search
CPC ............. H04N 21/812; H04N 21/4431; H04N 21/4435; H04N 21/4316; H04N 21/4438;
(Continued)

(56) References Cited

U.S. PATENT DOCUMENTS

| 4,296,533 A | 10/1981 | Doerter |
| 4,381,618 A | 5/1983 | Krisel |

(Continued)

FOREIGN PATENT DOCUMENTS

| CA | 2454011 A1 | 9/1999 |
| CN | 101753467 A | 6/2010 |

(Continued)

OTHER PUBLICATIONS

IQZONE Company, CN 107729093A, Method for showing advertisement on portable devices, (Year: 2018).*

(Continued)

*Primary Examiner* — Asghar H Bilgrami
(74) *Attorney, Agent, or Firm* — Cooley LLP

(57) ABSTRACT

A communication device configured to unobtrusively display media content. The processor receives an indication of a state transition of a first Activity and detects a first user interaction with the user interface, which may be done by inspecting a first operating system method called in relation to the first Activity. Upon determining the first Activity is finishing, the processor displays the media content. A backing Activity is then invoked behind the media content on a z-axis of the display wherein the operating system delays execution of the backing Activity for a predefined delay period subsequent to the selection of the user interface element. A second user interaction with the user interface is detected by inspecting a second operating system method called in relation to the backing Activity. The display of the media content is terminated upon the detection of the occurrence of the second user interaction.

20 Claims, 16 Drawing Sheets

Related U.S. Application Data filed on Oct. 25, 2019, provisional application No. 62/926,329, filed on Oct. 25, 2019, provisional application No. 62/926,331, filed on Oct. 25, 2019.

(51) Int. Cl.

| | | |
|---|---|---|
| *G06F 9/44* | (2018.01) | |
| *G06F 9/451* | (2018.01) | |
| *G06F 9/455* | (2018.01) | |
| *G06F 11/34* | (2006.01) | |
| *G06F 16/44* | (2019.01) | |
| *H04L 67/50* | (2022.01) | |
| *H04N 21/443* | (2011.01) | |
| *H04W 4/23* | (2018.01) | |
| *H04N 21/431* | (2011.01) | |
| *H04N 21/442* | (2011.01) | |
| *G06Q 30/0241* | (2023.01) | |
| *G06Q 30/0251* | (2023.01) | |

(52) U.S. Cl.
CPC .......... *G06F 9/451* (2018.02); *G06F 9/455* (2013.01); *G06F 11/3423* (2013.01); *G06F 16/444* (2019.01); *G06Q 30/0267* (2013.01); *G06Q 30/0277* (2013.01); *H04L 67/535* (2022.05); *H04N 21/4431* (2013.01); *H04N 21/4435* (2013.01); *H04W 4/23* (2018.02); *H04N 21/4316* (2013.01); *H04N 21/4438* (2013.01)

(58) Field of Classification Search
CPC ... H04N 21/44218; G06F 3/0481; G06F 9/44; G06F 9/451; G06F 9/455; G06F 11/3423; G06F 16/444; G06F 11/3438; G06Q 30/0267; G06Q 30/0277; H04L 67/535; H04W 4/23; Y02D 10/00
See application file for complete search history.

(56) References Cited

U.S. PATENT DOCUMENTS

| | | |
|---|---|---|
| 5,083,963 A | 1/1992 | Lin |
| 5,263,229 A | 11/1993 | Drummond |
| 5,659,988 A | 8/1997 | Kim et al. |
| 5,850,433 A | 12/1998 | Rondeau |
| 5,880,733 A | 3/1999 | Horvitz et al. |
| 5,880,773 A | 3/1999 | Suzuki |
| 6,173,316 B1 | 1/2001 | De et al. |
| 6,198,977 B1 | 3/2001 | Bixler et al. |
| 6,295,061 B1 | 9/2001 | Park et al. |
| 6,393,117 B1 | 5/2002 | Trell |
| 6,411,692 B1 | 6/2002 | Scherer |
| 6,425,017 B1 | 7/2002 | Dievendorff et al. |
| 6,545,589 B1 | 4/2003 | Fuller et al. |
| 6,560,456 B1 | 5/2003 | Lohtia et al. |
| 6,763,383 B1 | 7/2004 | Evison et al. |
| 6,993,326 B2 | 1/2006 | Link, II et al. |
| 6,993,553 B2 | 1/2006 | Kaneko et al. |
| 7,013,539 B2 | 3/2006 | Fildan et al. |
| 7,158,805 B1 | 1/2007 | Park et al. |
| 7,328,450 B2 | 2/2008 | Macrae et al. |
| 7,639,387 B2 | 12/2009 | Hull et al. |
| 7,712,657 B1 | 5/2010 | Block et al. |
| 7,720,828 B2 | 5/2010 | Bookstaff |
| 7,873,906 B2 | 1/2011 | Womack |
| 8,014,762 B2 | 9/2011 | Chmaytelli et al. |
| 8,078,493 B2 | 12/2011 | Rosenberg et al. |
| 8,175,992 B2 | 5/2012 | Bass, II et al. |
| 8,249,922 B2 | 8/2012 | Guo et al. |
| 8,265,607 B2 | 9/2012 | Wormald et al. |
| 8,924,252 B2 | 12/2014 | Feadler et al. |
| 9,641,888 B2 | 5/2017 | Kerns et al. |
| 9,740,397 B2 | 8/2017 | Yuan |
| 9,760,156 B2 | 9/2017 | Kim et al. |
| 10,977,425 B1* | 4/2021 | Jadunandan ............ G06F 40/14 |
| 11,375,289 B2 | 6/2022 | Feadler et al. |
| 2001/0036259 A1 | 11/2001 | Larger |
| 2002/0090198 A1 | 7/2002 | Rosenberg et al. |
| 2002/0103860 A1 | 8/2002 | Terada et al. |
| 2002/0107737 A1 | 8/2002 | Kaneko et al. |
| 2002/0156917 A1 | 10/2002 | Nye |
| 2003/0037068 A1 | 2/2003 | Thomas et al. |
| 2003/0088463 A1 | 5/2003 | Kanevsky et al. |
| 2003/0092432 A1 | 5/2003 | Hwang |
| 2003/0115587 A1 | 6/2003 | Kendall et al. |
| 2003/0184674 A1 | 10/2003 | Manico et al. |
| 2004/0028208 A1 | 2/2004 | Carnazza et al. |
| 2004/0049419 A1 | 3/2004 | Knight |
| 2004/0103171 A1 | 5/2004 | Mullis, II et al. |
| 2004/0162758 A1 | 8/2004 | Willis |
| 2004/0162759 A1 | 8/2004 | Willis |
| 2004/0215793 A1 | 10/2004 | Ryan et al. |
| 2005/0043995 A1 | 2/2005 | Nguyen |
| 2005/0074102 A1 | 4/2005 | Altberg et al. |
| 2005/0143138 A1 | 6/2005 | Lee et al. |
| 2005/0215238 A1 | 9/2005 | Macaluso |
| 2005/0216341 A1 | 9/2005 | Agarwal et al. |
| 2005/0216550 A1 | 9/2005 | Paseman et al. |
| 2005/0222908 A1 | 10/2005 | Altberg et al. |
| 2005/0282614 A1 | 12/2005 | Gauselmann |
| 2006/0004630 A1 | 1/2006 | Criddle et al. |
| 2006/0074905 A1 | 4/2006 | Yun et al. |
| 2006/0074910 A1 | 4/2006 | Yun et al. |
| 2006/0093120 A1 | 5/2006 | Thorpe et al. |
| 2006/0106793 A1 | 5/2006 | Liang |
| 2006/0149624 A1 | 7/2006 | Baluja et al. |
| 2006/0166655 A1 | 7/2006 | Montemer |
| 2006/0184512 A1 | 8/2006 | Kohanim et al. |
| 2006/0217110 A1 | 9/2006 | Othmer |
| 2006/0224445 A1 | 10/2006 | Axe et al. |
| 2006/0230362 A1 | 10/2006 | Matsusaka |
| 2006/0252414 A1 | 11/2006 | Tijerino |
| 2006/0256008 A1 | 11/2006 | Rosenberg |
| 2007/0061246 A1 | 3/2007 | Ramer et al. |
| 2007/0061317 A1 | 3/2007 | Ramer et al. |
| 2007/0123280 A1 | 5/2007 | McGary et al. |
| 2007/0124200 A1 | 5/2007 | Simons et al. |
| 2007/0129112 A1 | 6/2007 | Tarn |
| 2007/0265006 A1 | 11/2007 | Washok et al. |
| 2007/0271234 A1 | 11/2007 | Ravikiran |
| 2008/0027798 A1 | 1/2008 | Ramamurthi et al. |
| 2008/0052307 A1 | 2/2008 | Dunn et al. |
| 2008/0057915 A1 | 3/2008 | Lahtiranta et al. |
| 2008/0066080 A1 | 3/2008 | Campbell |
| 2008/0076414 A1 | 3/2008 | Kharebov et al. |
| 2008/0077483 A1 | 3/2008 | Hollo et al. |
| 2008/0097860 A1 | 4/2008 | Coutts et al. |
| 2008/0102887 A1 | 5/2008 | Sylthe et al. |
| 2008/0106645 A1 | 5/2008 | Lee et al. |
| 2008/0109547 A1 | 5/2008 | Bao et al. |
| 2008/0120289 A1 | 5/2008 | Golan et al. |
| 2008/0154723 A1 | 6/2008 | Ferguson et al. |
| 2008/0160956 A1 | 7/2008 | Jackson et al. |
| 2008/0160964 A1 | 7/2008 | Lichtenfeld et al. |
| 2008/0162312 A1 | 7/2008 | Sklovsky et al. |
| 2008/0212759 A1 | 9/2008 | Bates |
| 2008/0254821 A1 | 10/2008 | Kusuda et al. |
| 2008/0309617 A1 | 12/2008 | Kong et al. |
| 2009/0006211 A1 | 1/2009 | Perry et al. |
| 2009/0063297 A1 | 3/2009 | Dooley et al. |
| 2009/0143052 A1 | 6/2009 | Bates et al. |
| 2010/0100845 A1 | 4/2010 | Khan et al. |
| 2010/0114714 A1 | 5/2010 | Vitek |
| 2010/0185674 A1 | 7/2010 | Jobs et al. |
| 2010/0222046 A1 | 9/2010 | Cumming |
| 2010/0253764 A1 | 10/2010 | Sim et al. |
| 2010/0318414 A1 | 12/2010 | Ettala |
| 2010/0333130 A1 | 12/2010 | Peterson |
| 2011/0004518 A1 | 1/2011 | Boberg et al. |
| 2011/0016453 A1 | 1/2011 | Grechanik et al. |
| 2011/0065451 A1 | 3/2011 | Danado et al. |
| 2011/0088052 A1 | 4/2011 | Ramaswamy et al. |

(56) References Cited

U.S. PATENT DOCUMENTS

| | | | |
|---|---|---|---|
| 2011/0110515 | A1 | 5/2011 | Tidwell et al. |
| 2011/0208589 | A1* | 8/2011 | Garg .................. H04M 3/4878 |
| | | | 705/14.58 |
| 2011/0215966 | A1 | 9/2011 | Kim et al. |
| 2011/0252378 | A1 | 10/2011 | Anzures et al. |
| 2011/0296302 | A1 | 12/2011 | Baranov et al. |
| 2011/0316775 | A1 | 12/2011 | Heynen et al. |
| 2012/0066063 | A1 | 3/2012 | Quinn |
| 2012/0066069 | A1 | 3/2012 | Ferguson et al. |
| 2012/0096431 | A1 | 4/2012 | Madar |
| 2012/0115501 | A1 | 5/2012 | Zheng |
| 2012/0116881 | A1 | 5/2012 | Billings |
| 2012/0117024 | A1 | 5/2012 | Song et al. |
| 2012/0197727 | A1 | 8/2012 | Kim |
| 2012/0253939 | A1 | 10/2012 | Grigoriev et al. |
| 2012/0266107 | A1 | 10/2012 | Bates et al. |
| 2013/0304580 | A1 | 11/2013 | Feadler et al. |
| 2014/0156414 | A1 | 6/2014 | Feadler et al. |
| 2015/0178783 | A1* | 6/2015 | Feadler .............. G06Q 30/0242 |
| | | | 705/14.64 |
| 2015/0317024 | A1 | 11/2015 | Wang et al. |
| 2015/0332352 | A1 | 11/2015 | Kim |
| 2016/0189231 | A1* | 6/2016 | Jung ........................ G06F 21/62 |
| | | | 705/14.58 |
| 2016/0242024 | A1 | 8/2016 | Karren et al. |
| 2017/0024695 | A1 | 1/2017 | Wolfe, Jr. |
| 2017/0243252 | A1 | 8/2017 | Feadler et al. |
| 2017/0255967 | A1 | 9/2017 | Feadler et al. |
| 2017/0359280 | A1 | 12/2017 | Zhang |
| 2018/0178128 | A1 | 6/2018 | Onda et al. |
| 2020/0008016 | A1 | 1/2020 | Wu et al. |
| 2020/0111128 | A1 | 4/2020 | Feadler et al. |
| 2020/0167211 | A1 | 5/2020 | Yao |
| 2020/0210064 | A1 | 7/2020 | Li |
| 2020/0401467 | A1 | 12/2020 | Liu |
| 2021/0125229 | A1 | 4/2021 | Feadler et al. |
| 2021/0125230 | A1 | 4/2021 | Feadler et al. |
| 2021/0125239 | A1 | 4/2021 | Frodigh |
| 2021/0165479 | A1 | 6/2021 | Zheng et al. |
| 2022/0366452 | A1 | 11/2022 | Feadler et al. |
| 2023/0009540 | A1 | 1/2023 | Feadler et al. |

FOREIGN PATENT DOCUMENTS

| | | | |
|---|---|---|---|
| CN | 104184896 | A | 12/2014 |
| CN | 107729093 | A | 2/2018 |
| EP | 1094413 | A2 | 4/2001 |
| EP | 2156387 | A1 | 2/2010 |
| EP | 2224323 | A1 | 9/2010 |
| KR | 20020008492 | A | 1/2002 |
| KR | 100458195 | B1 | 11/2004 |
| KR | 100468944 | B1 | 2/2005 |
| WO | WO-0227699 | A2 | 4/2002 |
| WO | WO-2008095184 | A2 | 8/2008 |
| WO | WO-2009073637 | A2 | 6/2009 |
| WO | WO-2011147940 | A1 | 12/2011 |
| WO | WO-2013173390 | A1 | 11/2013 |
| WO | WO-2019171128 | A1 | 9/2019 |

OTHER PUBLICATIONS

Anonymous, "Android—onPause difference between screen lock and incoming call," Stack Overflow, Internet Article, Nov. 3, 2010. Retrieved from the Internet: URL: http://stackoverflow.com/questions/4087426/onpause-difference-between-screen-lock-and-incoming-call, 3 pages.

Anonymous, "Issue 4536 -android -1 .6/2.0: 5+ second delay launching any activity from service or receive—Android Open Source Project—Issue Tracker"1, Internet Article, Dec. 3, 2010, 3 pages. Retrieved from the Internets url: https://code.google.com/p/android/issues/detail?id=4536#c1 0 [retrieved on Apr. 5, 2017]</url:.

Basic Computger Tutorial, The Computer Technology Documentation Project, "Operating System Functions", online at comptechdoc.org, first published Apr. 5, 2004, 3 pages.

Bishop, L., "Android lifecycle for application developers: Guidelines and tips," May 30, 2011. Retrieved from the Internet: URL: http://developer.download.nvidia.com/assets/mobile/files/AndroidLifecycleAppNote VI00.pdf [retrieved on May 28, 2015], 30 pages.

Bishop, L., "Android lifecycle for application developers: Guidelines and tips," May 2012. Retrieved from the Internet: URL: http://developer.download.nvidia.com/assets/mobile/files/AndroidLifecycleAppNotev100.pdf, Nvidia, 33 pages.

Coresolo, "Revisions to Creating a system overlay window (always on top)—Stack Overflow", Internet Article, Dec. 19, 2010, 2 pages. Retrieved from the Internet: URL: http://stackoverflow.com/posts/4481226/revisions [retrieved on Apr. 5, 2017].

dictionary.com, Operating System, Mar. 12, 2020, 5 pages.

Dorman, "Sams Teach Yourself Windows Phone 7 Application Development in 24 Hours", Apr. 22, 2012, Sams Publishing, 50 pages.

Hart-Davis, "Mastering Microsoft Windows Vista Home: Premium and Basic", Feb. 5, 2007, 4 pages.

Hof, R., "Can Social Networks Ever Make Money on Mobile Ads?", Internet Article, Aug. 23, 2012. Retrieved from the Internet: URL: http://www.forbes.com/sites/roberthof/2012/08/23/can-social-networks-ever-make-money-on-mobile-ads/print/, 3 pages.

Hughes Systique "Best Practices for Memory Optimization on Android", Internet Archive Way Back Machine Capture date of Mar. 18, 2015, Internet Archive Way Back Machine, 2015, 20 pages.

International Preliminary Report on Patentability for International Application No. PCT/US2008/052849, dated Aug. 4, 2009, 5 pages.

International Preliminary Report on Patentability for International Application No. PCT/US2008/085207, dated Jun. 2, 2010, 6 pages.

International Preliminary Report on Patentability International Application No. PCT/US2013/041025, dated Nov. 18, 2014, 8 pages.

International Search Report and Written Opinion for International Application No. PCT/US2008/052849, dated Nov. 4, 2008, 9 pages.

International Search Report and Written Opinion for International Application No. PCT/US2008/085207, dated May 29, 2009, 5 pages.

International Search Report and Written Opinion for International Application No. PCT/US2013/041025, dated Sep. 23, 2013, 11 pages.

Investopedia, Andorid (Operating System), Capture Date of Jan. 16, 2016, Internet Archive WayBack Machine, 4 pages.

IQZONE Company, CN 107729093A, Method for showing advertisement on portable devices, 2018, 23 pages.

Irfan, M. et al., "Management of location based advertisement services using spatial triggers in cellular networks," International Journal of Computer Science and Information Security, 6(1):181-185 (2009).

MacKenzie, "Mobile ad formats for Android apps—Tech Republic", Internet Article, Sep. 26, 2012, 8 pages. Retrieved from the Internet: <url: http:www.techrepublic.com/blog/software-engineer/mobile-ad-formats-forandroid-apps/, [retrieved on Apr. 5, 2017].</url: http:>.

Meaurier, Listen for Home Button press, Stack Overflow, Aug. 16, 2018, 4 pages. https://stackoverflow.com/questions/51876716/listen-for-home-button-press.

Merriam-Webster, Operating System, Mar. 12, 2020, 9 pages.

Mew, K. M., "Activities - Managing the activity lifecycle," Chapter 1 In: "Android 3.0 Application Development Cookbook", Jul. 25, 2011, Packet Publishing, 31 pages.

MIT "ComponentCallbacks2" Internet Archive Way Back Machine Capture date of Feb. 6, 13, Internet Archive WayBack Machine, 2013, 5 pages.

Mlot, S., "Waze Launches In-App Advertising Platform," PCMag [online], Nov. 7, 2012. Retrieved from the Internet: http://www.pcmag.com/article2/0,2817,2411868,00.asp, 4 pages.

Pogue, "iPhone: The Missing Manual: Covers the iPhone 3G", Aug. 23, 2008, O'Reilly, 7 pages.

Supplementary European Search Report for European Application No. 13790001.5, dated Jun. 8, 2015, 9 pages.

(56) References Cited

OTHER PUBLICATIONS

Trademark Electronic Search System (TESS) "Android", United States Patent and Trademark Office, Mar. 14, 2019, 2 pages.

United States Patent and Trademark Office, International Search Report and Written Opinion for PCT/US2020/057400, dated Jan. 26, 2021, 7 pages.

United States Patent and Trademark Office, International Preliminary Report on Patentability for International Application No. PCT/US2020/057405, dated May 5, 2022, 6 pages.

Vardhan, Android: Solution to detect when an Android app goes to the background and come back to the foreground using Application.ActivityLifecycleCallbacks and ComponentCallbacks2, Vardhan Blog—My Experiences, Feb. 25, 2014, 11 pages.

Wei, J., "Handling Screen OFF and Screen ON Intents," Internet Article, Jan. 24, 2012. Retrieved from the Internet: URL: https://thinkandroid.wordpress.com/2010/01/24/handling-screen-off-and-screen-on-intents/, 14 pages.

Wikipedia, Android (Operating System), Capture date of Feb. 24, 2012, Internet Archive WayBack Machine, 22 pages.

Wikipedia, "Process management (computing)", Internet Article, May 5, 2012, 8 pages. Retrieved from the Internet:> url: https://en.wikipedia.org/w/index.php?title=Process_management_(computing)&oldid=490876457 [retrieved on Apr. 6, 2017]>/url:.

Zechner, M., "Android for Game Developers—Android API Basics," Chapter 4 In: "Beginning Android Games," Apr. 13, 2011, 83 pages.

\* cited by examiner

MONITORING OPERATING SYSTEM METHODS TO FACILITATE UNOBTRUSIVE DISPLAY OF MEDIA CONTENT ON PORTABLE DEVICES

CROSS REFERENCE TO RELATED APPLICATIONS

This application claims priority to and the benefit of U.S. Provisional Patent Application No. 62/926,322, entitled USING SYSTEM BROADCASTS TO UNOBTRUSIVELY DISPLAY MEDIA CONTENT ON PORTABLE DEVICES, filed on Oct. 25, 2019, of U.S. Provisional Patent Application No. 62/926,318, entitled MONITORING OPERATING SYSTEM METHODS TO FACILITATE UNOBTRUSIVE DISPLAY OF MEDIA CONTENT ON PORTABLE DEVICES, filed on Oct. 25, 2019, of U.S. Provisional Patent Application No. 62/926,329, entitled SYSTEM AND METHOD FOR USING ACTIVITY-BACKED OVERLAYS TO DISPLAY MEDIA CONTENT ON PORTABLE DEVICES DURING PERIODS OF USER INACTIVITY, filed on Oct. 25, 2019, and of U.S. Provisional Patent Application No. 62/926,331, entitled USING ACTIVITY-BACKED OVERLAYS TO DISPLAY RICH MEDIA CONTENT ON PORTABLE DEVICES DURING PERIODS OF USER INACTIVITY, filed on Oct. 25, 2019, the disclosures of each of which are incorporated herein by reference in their entirety for all purposes.

FIELD

The present disclosure relates generally to timely display of media content on portable devices. More particularly, but not exclusively, the present disclosure relates to systems and methods for unobtrusively displaying media content on portable devices.

BACKGROUND

Advertising is by its nature disruptive. Very few people will voluntarily choose to receive advertising. People are often angered by disruption that is caused by receiving pop-up advertisements and the like. Pop-up advertisements are typically delivered using a push model where a server remote from a user device forces advertising on the user device. Typically, the remote server is not aware of activities that the user is involved with on the user device at the time advertisements are delivered.

Mobile advertising systems have used the push model, whereby some external source sends messages which contain advertising-related information to a handset, and an agent on the handset consumes these messages and renders an advertisement without concern of what the user is doing. For this reason and others, mobile advertising has yet to grow into its full potential.

SUMMARY

Exemplary embodiments of the teachings disclosed herein are shown in the drawings summarized below. These and other embodiments are more fully described in the Detailed Description section. It is to be understood, however, that there is no intention to limit the claims to the forms described in this Summary or in the Detailed Description. One skilled in the art can recognize that there are numerous modifications, equivalents and alternative constructions that fall within the spirit and scope of the disclosed teachings as expressed in the claims.

In one aspect, the disclosure relates to a method of displaying media content on a display screen of a communication device. The communication device includes a processor and a memory including program code, an application program, and a user application. The application program includes a plurality of Activities associated with a plurality of display windows rendered by the display screen. The memory further includes an operating system providing an interface between the application program and the processor and the display screen, the processor performing the method by executing the program code. The method includes receiving, at a monitoring process, status callbacks provided by the operating system wherein the status callbacks relate to memory state. The method further includes inspecting values of at least one of the status callbacks wherein the at least one of the status callbacks includes a user interface (UI) state value and determining, based at least in part upon the UI state value, that a first Activity of the plurality of Activities is finishing. Upon determining the first Activity is finishing, displaying the media content upon the display screen upon further determining that a predetermined condition associated with the communication device exists.

The disclosure also pertains to a method of displaying media content on a display screen of a communication device. The communication device includes a processor and a memory including program code, an application program, and a user application. The application program includes a plurality of Activities associated with a plurality of display windows rendered by the display screen. The memory further includes an operating system providing an interface between the application program and the processor and the display screen. The processor performs the method by executing the program code. The method includes receiving, at a monitoring process, status callbacks provided by the operating system wherein the status callbacks relate to memory state. The method further includes inspecting values of at least one of the status callbacks wherein the at least one of the status callbacks includes a user interface (UI) state value. It is then determined, based at least in part upon the UI state value, that a first Activity of the plurality of Activities is finishing. Upon determining the first Activity is finishing, the media content is displayed upon the display screen in such a way as to include one or more UI elements defined by the user application.

In yet another aspect the disclosure is directed to a communication device including a processor, a display screen and a memory coupled to the processor. The memory contains an application program, a user application and program code for causing media content to be displayed on the display screen. The application program includes a plurality of Activities associated with a plurality of display windows rendered by the display screen. The memory further includes an operating system providing an interface between the application program and the processor and the display screen. The program code, when executed by the processor, causes the processor to receive, at a monitoring process, status callbacks provided by the operating system wherein the status callbacks relate to memory state. The program code further causes the processor to inspect values of at least one of the status callbacks wherein the at least one of the status callbacks includes a user interface (UI) state value. The processor also determines, based at least in part upon the UI state value, that a first Activity of the plurality of Activities is finishing. Upon determining the first Activity is finishing, the processor causes the media content to be displayed upon the display screen upon further determining that a predetermined condition associated with the communication device exists.

The disclosure is also directed to a method of displaying media content through a display of a communication device. The communication device includes a processor and a memory including program code and an operating system. The processor performs the method by executing the program code. The method includes registering a broadcast receiver with the operating system, the broadcast receiver being configured to receive system broadcasts. The method further includes receiving a first system broadcast generated by the operating system, the first system broadcast indicating a first user interface element has been selected. A View container is created in the memory, the View container including the media content. The View container is then painted on the display to thereby render the media content on the display. The method further includes receiving a second system broadcast generated by the operating system, the second system broadcast indicating the first user interface element has been again selected. The View container is then removed from the memory, thereby terminating rendering of the media content on the display.

In another aspect the disclosure relates to a communication device including a processor, a display, and a memory coupled to the processor. The memory contains an application program for causing media content to be displayed on the display wherein the application program includes a plurality of Activities associated with a plurality of display windows rendered by the display. The memory further includes program code and an Activity-based operating system, wherein the program code, when executed by the processor, causes the processor to register a broadcast receiver with the operating system, the broadcast receiver being configured to receive system broadcasts. The program code further configures the processor to receive a first system broadcast generated by the operating system, the first system broadcast indicating a first user interface element has been selected. The processor further operates to create a View container in the memory, the View container including the media content, and to paint the View container on the display to thereby render the media content on the display. The processor further receives a second system broadcast generated by the operating system, the second system broadcast indicating the first user interface element has been again selected. The program code further configures the processor to remove the View container from the memory, thereby terminating rendering of the media content on the display.

Also disclosed herein is a method of displaying media content through a user interface of a communication device. The communication device includes a processor, a memory including program code, an application program, and an Activity-based operating system wherein the application program uses a plurality of Activities associated with a plurality of display windows. The method includes receiving an indication of a state transition of a first Activity of the plurality of Activities. In response to this indication the processor executes the program code and in order to detect, by monitoring the operating system, a first user interaction with the user interface. The monitoring includes inspecting a first operating system method called in relation to the first Activity. The processor is further configured by the program code to determine whether the first Activity is finishing based at least in part on the detection of the first user interaction with the user interface and to display, upon determining the first Activity is finishing, the media content upon a display of the user interface. A backing Activity is invoked behind the media content on a z-axis of the display wherein the operating system delays execution of the backing Activity for a predefined delay period subsequent to the selection of the user interface element. The program code further configures the processor to detect, by monitoring the operating system subsequent to the predefined delay period, a second user interaction with the user interface wherein the monitoring the operating system subsequent to the predefined delay period includes inspecting a second operating system method called in relation to the backing Activity. The display of the media content is terminated upon the detection of the occurrence of the second user interaction.

In a further aspect the disclosure pertains to a communication device including a processor, a display, and a memory coupled to the processor. The memory contains program code, an application program, and an Activity-based operating system wherein the application program uses a plurality of Activities associated with a plurality of display windows. The program code, when executed by the processor, causes the processor to receive an indication of a state transition of a first Activity of the plurality of Activities. In response, the processor executes the program code in order to detect, by monitoring the operating system, a first user interaction with the user interface wherein the monitoring includes inspecting a first operating system method called in relation to the first Activity. Execution of the program code further causes the processor to determine whether the first Activity is finishing based at least in part on the detection of the first user interaction with the user interface. Upon determining the first Activity is finishing, the program code causes the processor to display the media content upon a display of the user interface. A backing Activity is then invoked behind the media content on a z-axis of the display wherein the operating system delays execution of the backing Activity for a predefined delay period subsequent to the selection of the user interface element. The program code further causes the processor to detect, by monitoring the operating system subsequent to the predefined delay period, a second user interaction with the user interface wherein the monitoring the operating system subsequent to the predefined delay period includes inspecting a second operating system method called in relation to the backing Activity. The display of the media content is terminated upon the detection of the occurrence of the second user interaction.

In yet a further aspect the disclosure is directed to a method of displaying media content through a user interface of a communication device using an Activity-based Overlay technique. The communication device includes a processor, a user interface and a memory including program code, an application program and an Activity-based operating system. The application program uses a plurality of Activities associated with a plurality of display windows. The processor performs the method by executing the program code. The method includes detecting a first user interaction with the user interface and responsively initiating a timer, the timer being configured to expire upon elapsing of a predefined delay period. An Overlay containing the media content is then rendered on a display of the user interface. The method further includes monitoring, during the predefined delay period, the operating system in order to detect a second user interaction with the user interface. Upon expiration of the timer, it is determined whether a detection of the second user interaction with the user interface occurred during the predefined delay period. A backing Activity associated with the Overlay is then invoked based upon this determination.

The disclosure further pertains to a communication device including a processor, a display, and a memory coupled to the processor. The memory contains program code, an application program and an Activity-based operating system. The application program uses a plurality of Activities associated with a plurality of display windows. The program code, when executed by the processor, configures the processor to perform a method which includes detecting a first user interaction with the user interface. The method further includes initiating a timer upon the detecting the first user interaction wherein the timer is configured expire upon elapsing of a predefined delay period. An Overlay containing the media content is rendered on a display of the user interface. The operating system is monitored during the predefined delay period in order to detect a second user interaction with the user interface. The method further includes determining, upon expiration of the timer, whether a detection of the second user interaction with the user interface occurred during the predefined delay period. A backing Activity associated with the Overlay is then invoked based upon this determination.

In another aspect the disclosure relates to a method for displaying rich media content through a user interface of a communication device. The communication device includes a processor, a display, a memory including program code, an application program, and an Activity-based operating system. The application program uses a plurality of Activities associated with a plurality of display windows. The rich media content includes one or more user-interactive elements. The method includes executing, by the processor and in response to the indication, the program code in order to detect a first user interaction with the user interface. The method further includes determining, based at least in part upon detection of the first user interaction, a first Activity of the plurality of Activities is finishing. Upon determining the first Activity is finishing, an Overlay containing the media content is rendered on the display. The Overlay is associated with a backing Activity, the operating system delaying execution of the backing Activity during a delay period initiated in response to the first user interaction with the user interface. The method further includes inhibiting Activity-supported functionality of the Overlay wherein the Activity-supported functionality is facilitated by the backing Activity. A context object associated with the Overlay is created to contain an Activity context associated with a state of the Overlay during the delay period. The method includes transferring the Activity context to the backing Activity and enabling Activity-supported functionality of the Overlay.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

For a better understanding of the nature and objects of various embodiments of the invention, reference should be made to the following detailed description taken in conjunction with the accompanying drawings, wherein.

Figure 1:
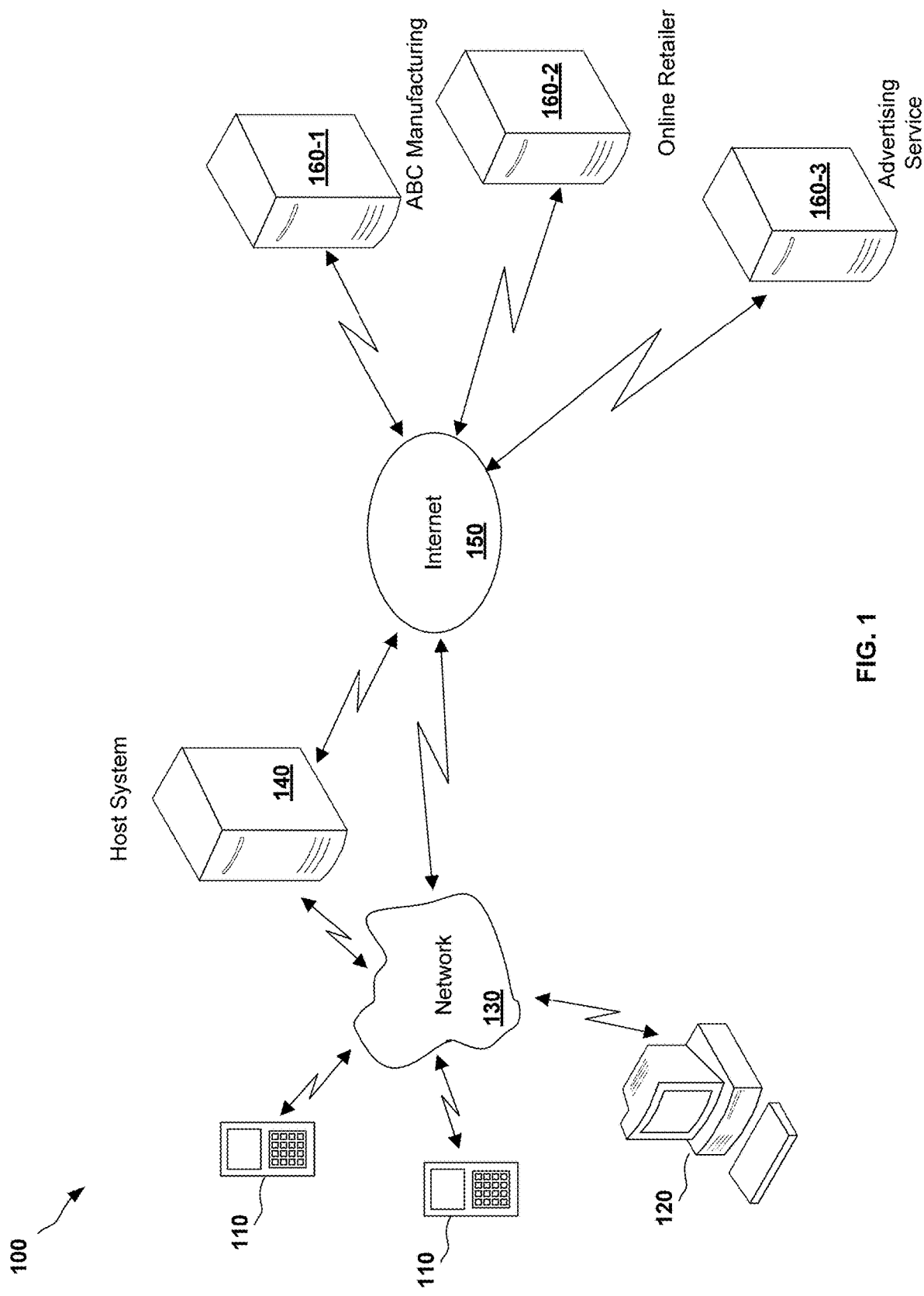
FIG. 1 illustrates an example system on which may be implemented various embodiments of methods in accordance with the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

As discussed above, people are generally annoyed and/or angered by disruption of their desired activity on computers, smart phones, tablets and the like. It has been found that an inverse relationship exists between the extent of an advertisement's disruptiveness and the willingness of a device user to engage it. Tests of user responsiveness bear this out. These tests have shown that a host system utilizing mobile advertising technology implementing a mechanism whereby mobile advertisements are rendered on behalf of a given application, but with timing that does not interfere with that application's user experience are responded to more favorably than other forms of mobile advertising. Systems and methods in accordance with the disclosure identify triggers that ensure that advertising, including rich media advertising, is rendered when the user completes an activity or otherwise interacts with an electronic system in a way that leaves a window of non-disruptive time. What these triggers are, with what frequency they are leveraged, and which advertising sources to use for content are fully customizable, often from a centralized, cloud-based mechanism (referred to herein as a host system), thereby allowing real-time modification of these parameters across entire user bases.

On the client side, this method of mobile advertising can be accomplished by the presence of an intelligent background agent. In one embodiment, such an agent could comprise a persistent system service which monitors the system for arbitrarily defined triggering events, and takes appropriate action to communicate with advertising providers. The background agent can be configured locally by default configuration parameters and/or remotely by the host system. In one embodiment this conforms to a pull advertising model where the mobile device requests content from the host system, as opposed to a push model where the host system forces content on the mobile device.

It is believed that users of electronic devices are psychologically more receptive to receiving unexpected content, including advertising content, if the advertising content is displayed in a non-disruptive manner. This approach has been shown by testing to achieve click-through rates (a standard measure of mobile and internet advertising's effectiveness) significantly higher than the industry standard.

In a typical embodiment, a host processing system (also denoted herein as a "host system" for brevity) includes one or more servers (also denoted herein as "host servers") configured to provide access to advertisement information from a myriad of sources, including brick and mortar retailers and wholesalers, online retail website or advertising services, and, in some embodiments, store this information in one or more databases in or associated with the host processing system. The host system may also be configured to interact with the users' portable devices to facilitate transfer of advertisements in a more pleasing fashion.

In addition, the host processing system may be configured to allow the host system or source to configure when information is displayed on a portable device. Portable or mobile devices may be configured in conjunction with a client application to facilitate the display of media content, such as by displaying an advertisement for a device action such as terminating a call.

In an exemplary embodiment, a user is provided with an application program (also denoted herein as a "client application") that may be installed on the user's portable device to facilitate downloading of media content (e.g., advertisements). The client application can be programmable with various configuration parameters. The configuration parameters can be used to determine which events can cause the client application to request an advertisement for display, how frequently advertisements can be displayed, which activities being performed after the event but prior to display of an advertisement can prevent display of the advertisement, etc.

By way of example, a user may be in the middle of a voice call while the client application is monitoring the operating system. When the voice call is ended, the operating system produces an event signal indicating the call termination event and this signal is detected by the client application. Assuming the client application is programmed to request an advertisement after detecting a call termination event, the client application sends an advertisement request message to a remote system (e.g., an advertisement source system or the host system). The host system, in response to receiving the request message, retrieves a current advertisement from the database and communicates the advertisement to the client application on the portable device. The client application then causes the operating system to display the advertisement on a display of the portable device.

In contrast to the event-based advertising embodiment where advertisements are requested upon an event being detected via a signal from the operating system (as described in reference to FIGS. 4, 5A and 5B below), another embodiment displays advertisements upon determining when an Activity is finishing. As used herein, an Activity is an application component that provides a screen with which users can interact in order to do something, such as dial the phone, take a photo, send an email, or view a map. Each Activity is given a window in which to draw its user interface. One operating system that uses Activities is the Android® operating system. Unlike triggering events, there is no direct indication provided by the operating system that an Activity is finishing. An indirect method of determining when an Activity is finishing is described below in reference to FIGS. 6A, 6B, 6C and 7. This indirect method also utilizes pre-fetching of advertisements since the Android® operating system has built-in delays that make requesting an advertisement after an Activity has finished cumbersome.

The systems and methods disclosed herein are applicable to a wide range of applications related to input, display, storage, processing, transmission, delivery, and other aspects of mobile advertising systems. For purposes of explanation, the following description is provided with reference to specific nomenclature and implementation details, typically in the context of a portable device in the form of a cellular or mobile phone; however, it will be apparent to one skilled in the art that specific details described are not required in order to practice the invention, and that other embodiments in keeping with the spirit and scope of the present invention are possible and fully contemplated herein.

Content Sources and Content Selection and Provision

Attention is now directed to FIG. 1, which illustrates a system 100 on which may be implemented embodiments of the present invention. As shown in FIG. 1, content may originate from sources such as an ABC Manufacturing server 160-1 (i.e., a brick and mortar enterprise), an online retailer server 160-2 (i.e., a server associated with a website) or an advertising service server 160-3, or any of many other sites that contain advertisement information, public service announcements and/or other timely information. In addition to those shown in FIG. 1, it will be apparent to one of ordinary skill in the art that other sources of advertising content are available and other means, in addition to the Internet and Cellular/Telephony networks, may be employed to provide such content. Accordingly, the above list of advertising content sources is only intended to be representative, not limiting.

Communications Between Devices and Systems

System 100 includes one or more portable or mobile devices 110 (also denoted herein for brevity as "devices 110") such as cellular phones, tablet computers, PDAs, Wi-Fi (802.11) devices or other portable devices. It is further noted that, in some embodiments, the device need not necessarily be portable and the functionality herein may be implemented on more stationary devices such as desktop or notebook computers or other types of fixed devices. In addition, portable devices as described herein may include other types of devices that are mobile but not necessarily portable.

In addition to devices 110, system 100 may include one or more computers 120 such as desktop computers, portable or notebook computers or other devices or systems incorporating computer functionality along with wired or wireless network connectivity. For example, embodiments of the present invention may be implemented on various types of embedded devices or Internet appliance devices or similar types of devices.

System 100 further includes a host processing system 140 (also denoted herein as "host system 140") comprising one or more servers as well as other associated computer and data processing hardware (not shown in FIG. 1) such as networking equipment, displays, monitors, I/O devices or other computer or data communication systems, hardware and/or software. In an exemplary embodiment, host system 140 may be provided by or operated by an associated host services company or host services supplier.

Figure 3:
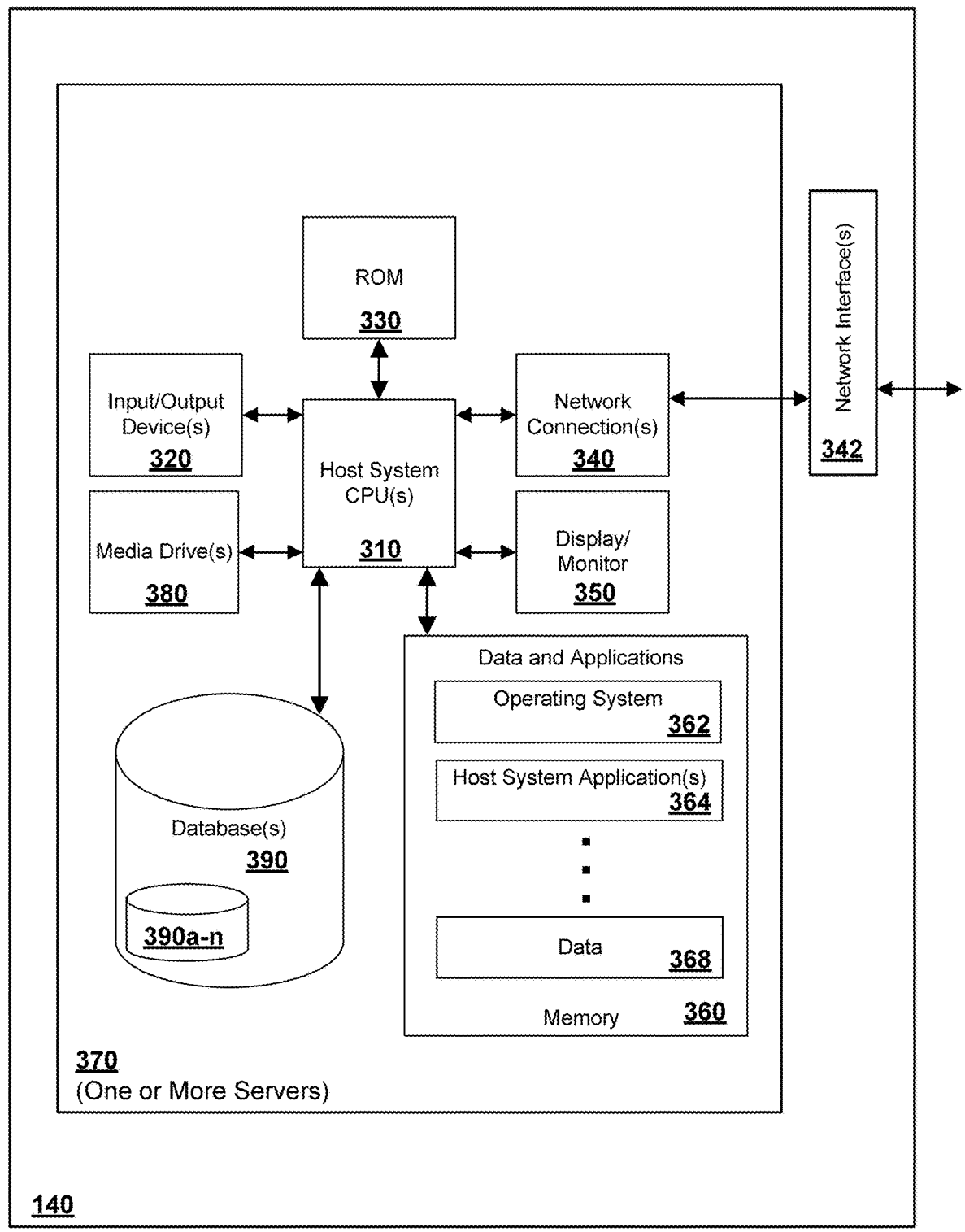
FIG. 3 illustrates a host system configuration on which may be implemented various embodiments of systems and methods in accordance with the disclosure.

As noted previously, host system 140 includes one or more servers that include one or more databases 390 (as shown in FIG. 3) either internal or external to the servers 370. These databases may be used to store advertisements and data such as is further described below. Host system 140 may also include one or more operating systems 362 associated with the servers, as well as one or more application programs to implement the various host service functionality as is described further herein. Host system 140 may be implemented at a centralized physical location such as a network connected server farm or other similar facility and/or may comprise a plurality of distributed servers connected by any of a variety of networking connections at different physical locations.

Figure 2:
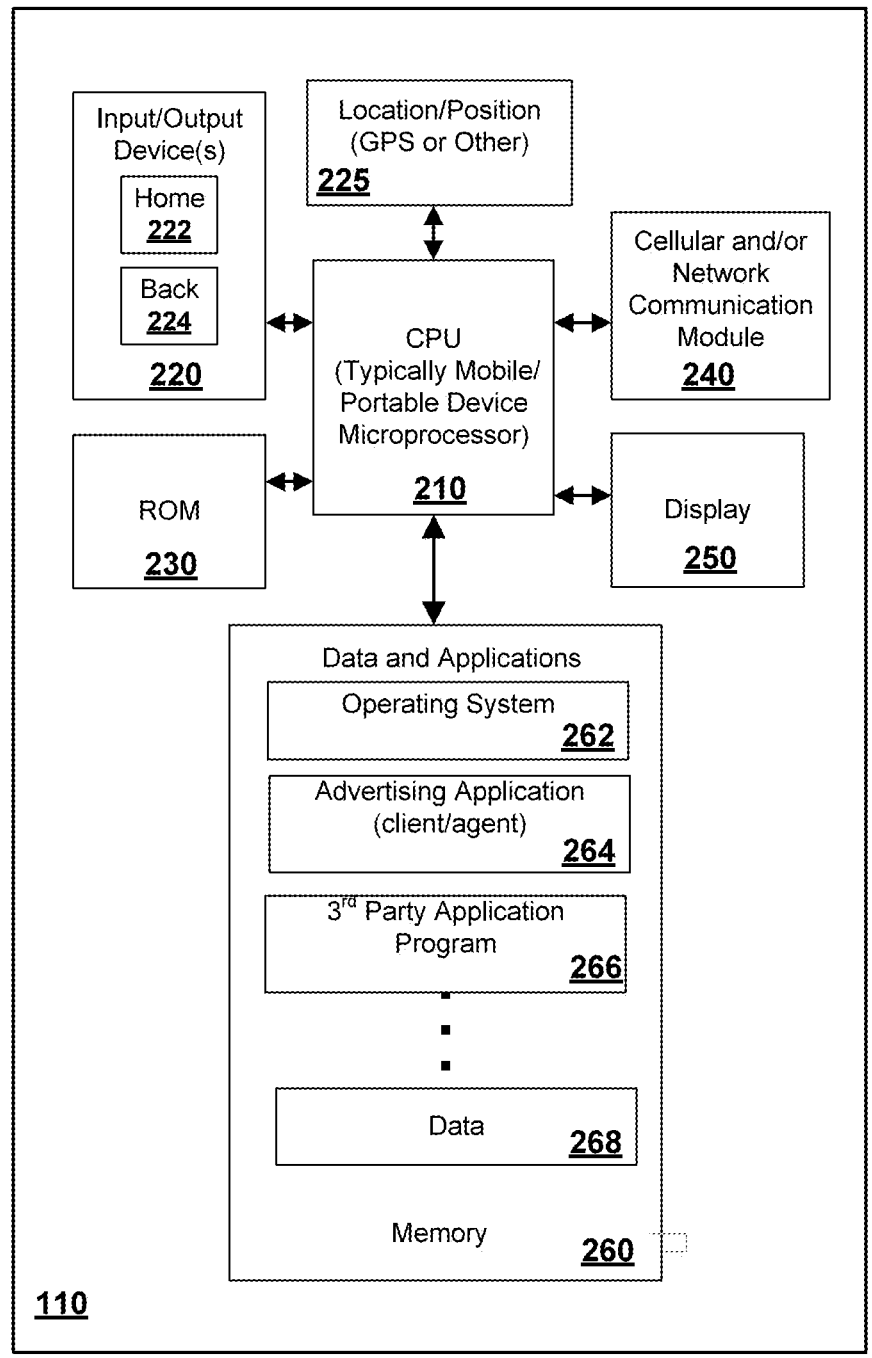
FIG. 2 illustrates a device configuration for a portable device on which may be implemented various embodiments of systems and methods in accordance with the disclosure.

Devices 110 and computers 120 (also denoted collectively herein as devices 110 and 120 for brevity) are typically configured to connect to each other and/or to host system 140 through network 130 as shown in FIG. 1. Network 130 may include wired or wireless networking elements such as Ethernet, LAN technologies, telephony networks such as POTS phone networks, cellular networks, data networks, or other telephony networks as well as Wi-Fi or Wi-Max networks, other wired or wireless Internet network connections and/or other networks as are known or developed in the art. These connections may be facilitated by one or more client applications 264 (as shown in FIG. 2) running on devices 110 or 120 as well as one or more host system applications 364 running on one or more host system servers 370 included in host system 140, along with one more network interfaces 342 and/or other networking hardware and/or software as is known or developed in the art (not shown).

In some embodiments, host system 140 is further configured to provide a network connection through the Internet 150 to one or more advertisement source sites 160, such as the brick and mortar enterprise server 160-1, the online retailer server 160-2, the advertising service server 160-3 or similar sources. These connections may be facilitated by one or more application programs 364 running on host system 140.

As discussed above, a "pull" method, as is known in the art, is used to deliver advertisements to the devices 110 or 120. The devices 110 and 120 can request an advertisement from one or more advertisement source sites 160, such as the brick and mortar enterprise server 160-1, the online retailer server 160-2, the advertising service server 160-3 or similar sources. The network 130 is coupled to the Internet 150 such that the requests can be routed from the devices 110 and 120 to the advertisement source sites 160. In some embodiments, an advertisement is requested by devices 110 or 120 from the host system 140. The advertisements can be requested after a trigger event has been detected. An advertisement is then pulled from either one of the advertisement sources 160 or the host system 140, as determined by configuration parameters as described herein (as used herein, "advertisement source system" refers to either the host system 140 or one of the advertisement sources 160). For example, when device 110 is a cell phone, when the cell phone terminates a call or performs some other trigger event, the client application 264 will create an advertisement request message, which is then sent to an advertisement source. The request message may contain a user identifier, an indication of the type of event, an indication of the type of device, etc. The advertisement source system then retrieves a suitable advertisement from one of several databases. The advertisement source system then sends the selected advertisement to the device 110 or 120 via the network 130. The client application determines if it is still a proper time (as determined by several factors discussed below) to display the advertisement. If it is still a proper time, the client application 264 causes the device 110 or 120 to display the advertisement, typically through an application program 266 already active on the device 110 or 120. The client application 264 may send another message to the advertisement source system indicating whether or not the advertisement was displayed.

Client Application

In one aspect, the user may be provided with a client application or applications 264, as shown in FIG. 2 (also denoted herein as a "client" for purposes of brevity) that may be installed on the user's device 110. For example, the user may be provided with a download of the client application 264 from a host system 140 or affiliated web site. The client application 264 may be installed on a ROM (read only memory) 230 at a factory, thereby negating the need for the user to download the client 264. Alternately, the user may be supplied with the client application 264 on a computer media such as a CD or DVD, a thumb drive, or via other media known or developed in the art. Once the user downloads or otherwise obtains the client application 264 and installs the client application 264 on the user's device 110, the user may then access the host system 140 and associated host service and advertising source systems to implement the functionality described herein. The client application 264 is configured to determine when operating system 262 performs one of the trigger events and then transfers an advertising request message to the advertising source system and receives an advertisement.

For example, in some embodiments, the client application 264 is a game application, a video application or any other type of application that the user would use on the mobile device 110 and the functionality described herein is integrated into the application. In other embodiments, the client application 264 may be utilized by third party application developers and/or advertising services using what is known in the art as a software development kit or SDK. A library of functions of the SDK could be stored in a data module 268 to provide the pull advertising functionality of the client application 264 to third party applications 266 so as to perform the methods discussed herein. When the client application is part of an SDK (such as with the processes 400 and 500 discussed below) that is a service installed on the portable device 110, an application such as a game that utilizes the client application 264 of the SDK could be installed on the device 110 and the client application 264 would automatically be installed as a separate entity if the client application 264 were not already installed. There could be multiple applications on the device 110 that use the client application 264.

In cases where the client application 264 is part of an SDK on the device 110, upon installation of a new application 266 that utilizes the client application 264, the new application 266 registers with the client application 264. Registration can include the new application 266 providing a unique identifier to the client application 264 such that the client application 264 knows what type of application the new application 266 is. Upon installation of the new application 266, the client application 264 informs the host system 140 that the new application 266 is installed on the device 110 and is registered with the client application 264.

FIG. 2 illustrates additional details of a typical configuration of a portable device 110 with example device elements that may be used to implement embodiments of the systems and methods in accordance with the disclosure. As shown in FIG. 2, device 110 may include one or more processors (CPUs) 210, which are typically one or more specialized or dedicated portable device microprocessors or microcontrollers, an input/output device module 220 (e.g., a user interface) configured to allow users to input and output information and interact with applications installed on the device 110, such as the client application 264, as well as transfer and receive advertising data, one or more read only memory (ROM) devices 230 or equivalents to provide non-volatile storage of data and/or application or operating system programs, one or more display modules 250, such as an LCD or equivalent display device, as well as one or more memory spaces 260. Other modules, such as optional GPS module 225 for providing position or location information may also be included.

The input/output device module 220, in this example, includes a Home button 222 and a Back button 224. The user can exit an Activity by pressing either the Home button 222 or the Back button 224. The Home button 222 and the Back button 224 can be physical buttons or virtual buttons (e.g., on a touch sensitive display 250). When the user presses the Home button 222, the current Activity is hidden and the display 250 displays a default or Home image. When the Back button 224 is pressed, the current Activity is exited and the display is returned to the display that was being displayed prior to the current Activity.

Memory space 260 may comprise DRAM, SRAM, FLASH, hard disk drives or other memory storage devices configured to store and access operating systems 262, client application programs 264 and/or data 268. Data 268 may include information such as advertisements received from an advertising source system. The advertisements may be in the form of images/photos, videos, music content, or other types of data. In particular, memory space 260 may include one or more client applications 264 stored in the memory space 260 for execution on the CPU 210 to perform the various client-side functionality described herein, including displaying and storing advertisements, or other data or information, as well as interacting with host system 140 and advertising sources 160.

FIG. 3 illustrates additional details of one example of a host system 140 with example device elements that may be used to implement embodiments of the present invention. As shown in FIG. 3, host system 140 may include one or more processors (CPUs) 310, an input/output device module 320 configured to allow users to input and output information and interact with the host system 140 as well as transfer and receive data, one or more read only memory (ROM) devices 330 or equivalents to provide non-volatile storage of data and/or programs, one or more display modules 350 such as a computer monitor or other display device, one or more network connections 340 and associated network interfaces 342 configured to allow host system 140 to connect to other systems, servers and/or portable devices, including other elements of system 140 in embodiments where the servers or other components are distributed at other physical locations, as well as one or more memory spaces 360 and one or more databases 390. Database(s) 390 may be further divided or distributed as one or more sub-databases 390a-390n, with the sub-databases storing feature or function specific information associated with a particular feature or function. The various components shown in FIG. 3 may be incorporated in one or more physical servers 370 comprising part of host system 140. It is noted that the various components shown in FIG. 3, including database 390, are typically included as part of server(s) 370, however, they may be external to server(s) 370 in some embodiments. For example, in some embodiments database(s) 390 may be external to server(s) 370 and may comprise part of a separate database server system or networked database system.

Memory space 360 may comprise DRAM, SRAM, FLASH, hard disk drives or other memory storage devices, such as media drives 380, configured to store operating systems, application programs and/or data, and memory space 360 may be shared with, distributed with or overlap with the memory storage capacity of database 390. In some embodiments, memory space 360 may include database 390 or in some embodiments database 390 may include data 368 as shown in memory space 360.

Data stored in memory space 360 and/or database 390 may include information such as advertising source system information, advertisements, images/photos, videos, music content, or other types of data. In particular, memory space 360 may include a host system application or applications 364 stored in the memory space for execution on CPU 310 to perform the various host-side functions described herein.

Host System Server Transmitting Information to Clients

Figure 4:
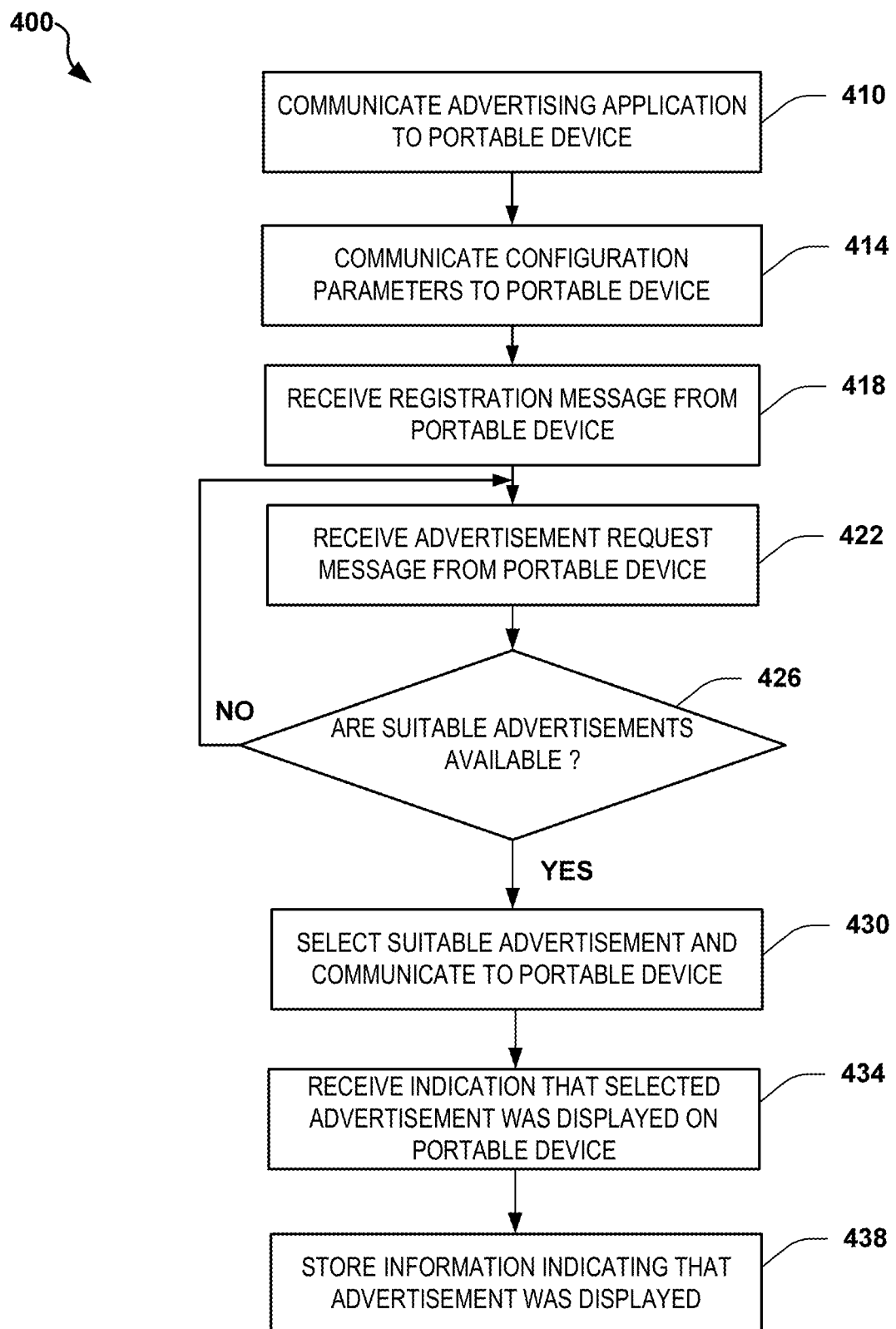
FIG. 4 illustrates an exemplary process for facilitating delivery of information to a portable device in accordance with the disclosure.

FIG. 4 illustrates an exemplary process 400 for facilitating delivery of information to a portable device in accordance with the disclosure. The process 400 can involve the host system 140 and one or more advertising sources 160 communicating with the portable device 110 via one or more wired and/or wireless communication channels. The process 400 is used with embodiments where client application 264 is part of an SDK that is a service installed on the portable device 110. At stage 410, the host system 140 communicates an advertising application, such as the client application 264 of FIG. 2, to the portable device 110. Alternatively, the client application 264 could be previously stored in a memory of the portable device 110 and stage 410 could be omitted from the process 400.

At stage 414, the host system 140 communicates configuration parameters to the portable device 110. The configuration parameters can be communicated to the portable device 110 in response to receiving a configuration update request from the portable device 110. Such an update request can be made upon first receiving a registration message from the client application 264 with the host system 140 at stage 418, for example. In addition, an update request could be received periodically from the portable device 110 in order to change, for example, which trigger events result in an advertisement being requested by the portable device 110, which advertising source systems to utilize for advertisements and how frequently advertisements can be displayed.

At stage 418, the host system 140 receives a registration message from the client application 264 installed on the portable device 110. The registration message can include information which describes the capabilities of the device 110 as well as other data associated with the portable device 110 and/or the client application 264. For example, one of the portable device 110 capabilities may include display capabilities (number of pixels, video graphics capability, audio capability, etc.) The client application 264 may also tell the host system 140 which event triggers the operating system 262 is capable of reporting to the client application. For instance, trigger events reported by the operating system 262 may include voice call initiation and termination, text message initiation and termination, pausing of a video game application, termination of any type of interactive application, etc.

Additionally, the client 264 may specify picture sizes and formats it wants to receive from the host system 140, such as sizes and formats based on the capabilities of the device 110 and/or based on other parameters such as memory capacity, download connection capacity or costs, or other parameters. The host system 140 receives this information from the client 264, and, in response, in embodiments where the host system delivers advertisements, the host system 140 formats the advertising data specifically for each client based on the client's request and portable device 110 capabilities.

At stage 422, the advertising source system (e.g., either the host system 140 or one of the advertising sources 160 as determined by the configuration parameters) receives an advertisement request message from the client application 264 running on the portable device 110. The advertisement request message may be in response to any of the trigger events that the operating system 262 reports to the client application 264. In addition, the client application 264 can be programmed by the host system 140 via the configuration parameters communicated at stage 414. The advertising request message can include an identifier of the portable device 110 and/or an identity of a user of the portable device 110. The advertising request message can also include an indication of the trigger event that resulted in the request message being communicated.

Upon receiving the advertising request message, the advertising source system determines, at decision block 426, if there are any suitable advertisements to be communicated to the portable device 110. Suitability of the advertisements may be determined based on an identity of the user, a time of day, a geographic location of the portable device, demographics of the user, etc. If no suitable advertisement is identified at the decision block 426, the process 400 returns to stage 422 to receive another advertisement request message.

If a suitable advertisement is identified at the decision block 426, the process 400 continues to stage 430 where the advertising source system selects one of the suitable advertisements and communicates the selected advertisement via the network interface 342 to the portable device 110 to be displayed by the client application 264. The advertisement can be configured based on properties of the portable device 110 such as, for example, display size, video graphics capability, audio capability, etc.

At stage 434, the host system 140 receives an indication, from the portable device 110 via the network interface, of whether or not the advertisement was displayed on the portable device 110. In some cases, the user of the portable device may initiate a new Activity prior to the advertisement being communicated to the portable device 110. In these cases, the client application 264 may determine that it is not a suitable time to display the advertisement because, for example, the advertisement may be a nuisance to the user performing the new Activity. For example, if the user initiates another voice call immediately after terminating one call, this may be determined, based on the configuration parameters, to not be a proper time to display an advertisement. If an advertisement was displayed, the indication received at stage 434 may indicate which advertisement was displayed, which portable device it was displayed on and any user click-throughs or other interaction with the advertisement.

At stage 438, the host system 140 stores an indication in the database 390 of the advertisement that was displayed. In addition, the host system 140 may also store information indicative of user interaction with the advertisement as well as an identity of the user or an identifier of the portable device.

The process 400 is exemplary only and not limiting. The process 400 can be altered, e.g., by having stages added, removed or rearranged. Still other alterations to the process 400 as shown and described are possible.

Receiving Advertisement Information on the Portable Device

Figure 5A:
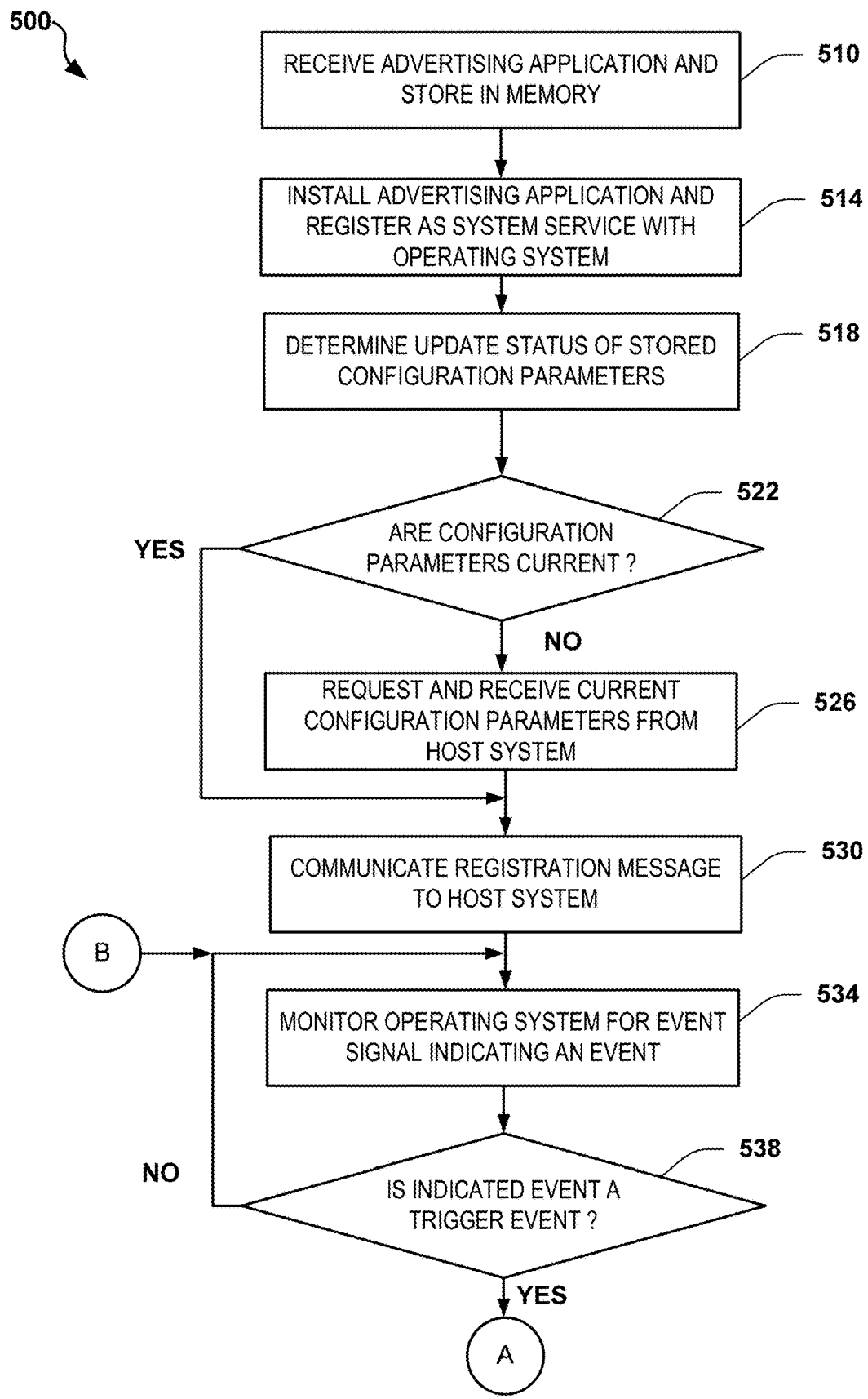
FIGS. 5A and 5B illustrate an exemplary process for requesting delivery of information to a portable device in accordance with the disclosure.
Figure 5B:
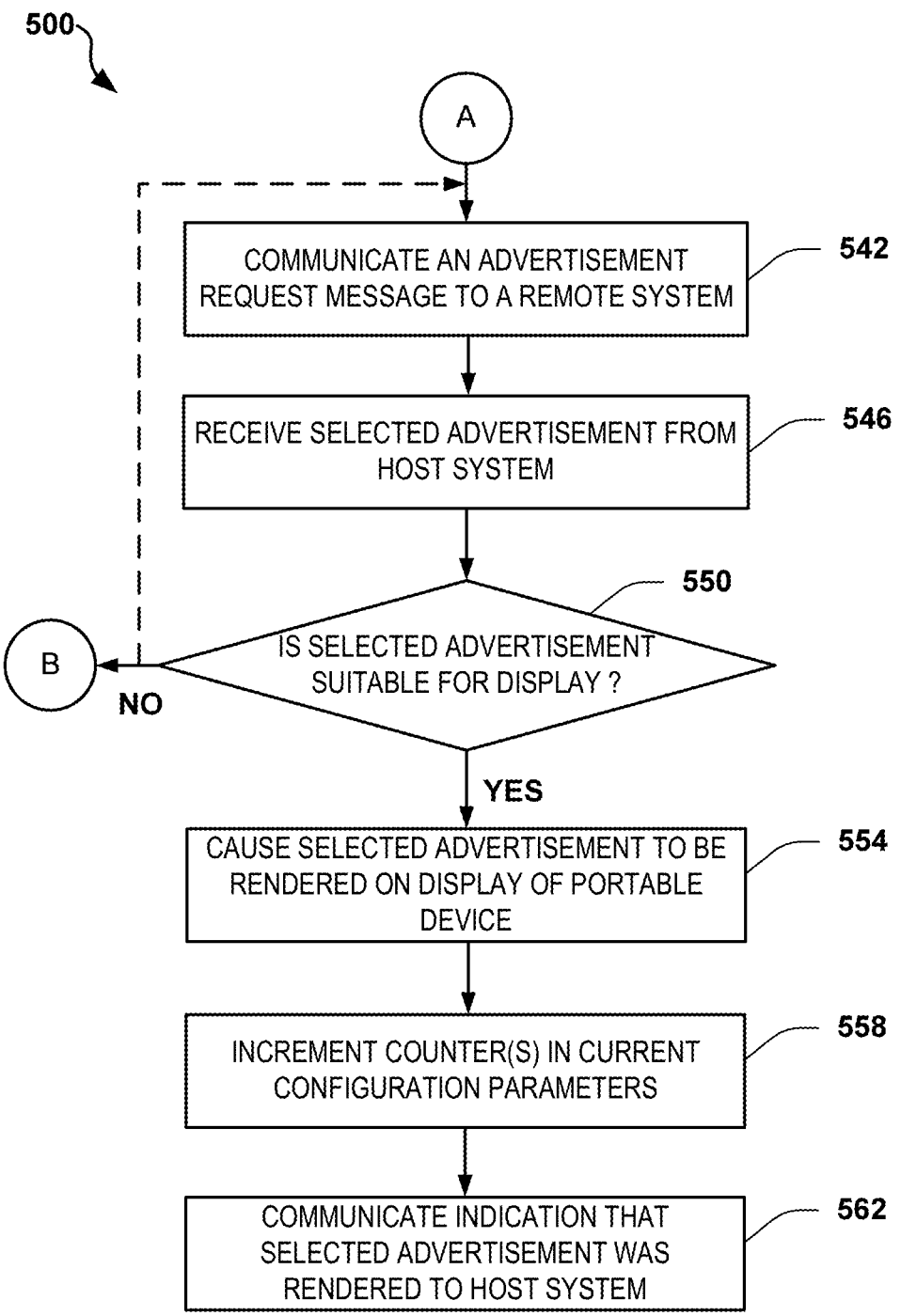

FIGS. 5A and 5B illustrate an exemplary process 500 for requesting delivery of information to the portable device 110 in accordance with the disclosure. As with process 400, the process 500 is used with embodiments where the client application 264 is part of an SDK that is a service installed on the portable device 110. After a user has installed the client application 264 on the portable device 110, they can receive advertisement information in a number of ways. Examples are further described below. The process 500 will be described in reference to the portable device 110 (e.g., using the processor 210) and the host system 140, but other devices, portable and non-portable, for example, can be used.

At stage 510, the portable device 110 receives the client application 264 and stores the client application 264 in the memory 260. The client application 264 can be received over a wireless or wired connection via a communications module herein depicted by cellular/network connections 240. For example, a user could download the application from an online applications website, or from one or more third parties that provide applications. Alternatively, the client application can be received in a factory at the time of manufacture/provisioning of the portable device 110 prior to purchase by the user.

Upon completion of the download process, the process 500 continues to stage 514, where an installation process is triggered, during which the client application 264 is installed and registers itself as a system service with the operating system 262 of the portable device 110. A system service is a term of art describing an application that, upon being registered, can run persistently in the background and monitor the operating system 262 for information regarding other events occurring such as the triggering events associated with receiving advertisements. The capabilities of a system service depend on the operating system 262.

In some embodiments, the client application 264 registers with the operating system 262 as a listener for events of interest associated with user interactions with the portable device 110. The events of interest include triggering events indicative of a non-disruptive moment suitable for display of an advertisement (e.g., termination of call, completion of outbound SMS, termination of specific application, etc.). As an example, the operating system 262 may provide a signal indicating that an application identified by a unique identifier has terminated. In cases where applications on the portable device 110 register with the client application 264, the client application 264 uses the registration information to identify exactly which application has terminated. In this way, the advertisements could be targeted to exactly which application has terminated, or paused, etc. In some embodiments, the user of the portable device 110 may be queried for permission to allow the client application 264 to register as a listener for the events of interest. The permission could be an all or nothing permission where the user is asked once for permission for an application to be a listener and no further permission is needed. Alternatively, the query for permission could be done periodically.

The installation of the client application 264 can be triggered by a user initiating the installation by actuating one of the input devices 220 on the portable device. Upon installation and/or activation of the client application, the process 500 continues to stage 518 where the client application 264 determines the update status of the configuration parameters controlling the operation of the client application 264. Upon initial installation and/or activation of the client application, the configuration parameters may be set to default parameter and may not need updating at first. Alternatively, the configuration parameters may not be set at all and may be in need of immediate updating. Configuration parameters can be stored with a date or version number in order for the client application 264 to be able to determine the update status based on a date or version number provided by the host system 140, for example.

At decision block 522, the client application determines if the configuration parameters are current. If the client application 264 has just been installed and the configuration parameters have been set to default values, it may determine at decision block 522 that the configuration parameters are current and not in need of updating. If the client application 264 has been installed with no default configuration parameters, it is determined at decision block 522 that the configuration parameters are not current. In addition, the client application 264 may be configured to update the configuration parameters periodically and it may be determined at decision block 522 that the configuration parameters are not current based on a timer or a version number.

If it is determined at decision block 522 that the configuration parameters are current, the process 500 continues to stage 530. If it is determined that the configuration parameters are not current, the process 500 continues to stage 526 where the client application 264 communicates a request for updated configuration parameters to the operating system 262 which then communicates the request to the host system 140 via one of the network connections 240. In response to the request, the host system 140 sends updated configuration parameters to the portable device 110 which are received by the client application 264 and stored in the memory 260.

The configuration parameters that are received at stage 526 define one or more events that can trigger the client application 264 to request an advertisement from the host system 140. In addition, the configuration parameters can define events that should not be interrupted by displaying an advertisement. The configuration parameters can also be designed to define the frequency that the client application 264 wakes up to perform monitoring of the operating system 262 in order to preserve battery life. Depending on the type of portable device, the configuration parameters could be based on the type of radio connection and further tune the sleep mode/wakeup frequency. The configuration parameters can also include steps used by the client application 264 to remain running at all times, at least in a sleep mode, and steps to enable the client application 264 to restart itself when terminated. Configuration parameters can be customized according to device manufacturer/model, wireless carrier, geographical location, etc. Trigger events defined by the configuration parameters could depend on other equipment connected to the portable device 110. For example, the trigger events could be associated with whether there is a keyboard available or whether there is a Bluetooth headset.

In addition, configuration parameters received at stage 526 can define which advertising source systems the client application should request advertisements from. The configuration parameters could define different advertising source systems depending on, for example, which application the event is associated with, what type of event occurred, the time of day, location, etc.

At stage 530, the client application 264 communicates a registration message to the operating system 262 to be communicated to the host system 140 via one of the network connections 240. The registration message informs the host system 140 that the user has registered the portable device 110 and/or one or more applications to receive advertisements.

At stage 534, upon being activated and registered, the client application 264 begins monitoring the operating system 262 for event signals indicating the occurrences of triggering events that can signal an opportunity to request and display an advertisement. The triggering events can be a termination of a user interaction with the portable device such that the user is not disturbed by an advertisement being displayed. Such triggering events can include call termination, text message termination, application termination or pause, or any other event that signals that the user has completed some form of interaction with the portable device 110. Upon receiving the event signal, the client application 264 reads the event signal to determine what event is indicated to have occurred and queries for the current configuration parameters to determine if conditions are suitable for requesting and displaying an advertisement. In addition to terminating events such as call termination, game termination, text message termination, a trigger event could include non-terminating events such as a lock screen event or a display screen going dark. The client application 264 can be configured such that advertisements that are requested to be displayed during a lock screen or a dark screen even can be persistent and be displayed after the user actuates an input device to unlock or undarken the display screen.

When an event signal is detected at stage 534 by the client application 264, the process 500 continues to decision block 538 where the client application 264 determines if the indicated event is a trigger event, based on the current configuration parameters. If it is determined at decision block 538 that the indicated event is not a trigger event, the process 500 returns to stage 534 where the client application 264 continues to monitor the operating system 262 for event signals. If it is determined at decision block 538 that the indicated event is a trigger event, based on the current configuration parameters, the process continues to stage 542.

At stage 542, the client application 264 communicates an advertisement request message to the operating system 262 to be communicated to an advertising source system, as determined by the configuration parameters, via one of the network connections 240. The advertisement request message can include the trigger event, the identifier of the portable device, the identity of the user, an identifier of the application associated with the event etc. At stage 546, the portable device 110 receives an advertisement selected by the advertising source system. The selected advertisement is received via one of the network connections 240. The advertisement can be received by leveraging webservices over a data (IP) network using HTTP/S encapsulation of SOAP (Simple Object Access Protocol) envelopes containing custom XML payloads optimized for brevity, or via any other available network transport and data description protocols. SOAP is a protocol for exchanging structured information in the implementation of web services.

When an advertisement is being received, in one embodiment, the client application 264 avoids querying the host system 140 for new configuration parameters in order to reduce the amount of network transit, and therefore time required for an advertisement to be displayed. This also reduces the amount of time that the radio is used, thereby saving power because the radio typically uses the most power in the portable device 110.

Upon receiving the selected advertisement, the client application 264 determines, at decision block 550, whether the selected advertisement is suitable for display based on the current configuration parameters. Reasons for an advertisement being unsuitable for display at the time the advertisement is received can include, for example, when the trigger event is closely followed by another event that is determined to be inappropriate to interrupt with an advertisement (e.g., a termination of a text message or call closely following an initiation of another text message or call), a threshold number or count of advertisements having been displayed within a threshold time period being exceeded, a threshold time period has not elapsed since the last advertisement was displayed, a battery power level on the portable device 110 registers below a threshold value, etc. In addition, if no advertisement were available from the advertising source system, there would also be no suitable advertisement for display.

The user could define types of advertisements that should be blocked as being unsuitable. For example, a user could choose to block advertisements for dating websites, alcohol, or other classes of advertisements. These blocked classes of advertisements could be input by the user at stage 518 in the form of configuration parameters.

If it is determined at decision block 550 that the selected advertisement is not suitable for display, the process can return to stage 534 to monitor for more trigger events indicated by event signals or, alternatively, return to stage 542 to request another advertisement. If it is determined that the advertisement is suitable for display, the client application 264 causes the selected advertisement to be rendered on a display of the portable device 110 at stage 554. At stage 558, the client application 264 increments one or more advertisement counters, and in some embodiments stores a time the advertisement was rendered, in order to limit the frequency that future advertisements are displayed. Multiple counters can be used in order to limit the number of advertisements displayed during different time periods such, for example, a number per hour, a number per day, a number per week, etc. At stage 562, the client application 264 causes the operating system 262 to communicate an indication that the selected advertisement was displayed to the host system 140 and/or the advertising source system via one of the network connections 240.

The process 500 repeats to perform the functions of the various stages as discussed above. The process 500 is exemplary only and not limiting. The process 500 can be altered, e.g., by having stages added, removed or rearranged. Still other alterations to the process 500 as shown and described are possible.

In the processes 400 and 500 discussed above, advertisements were displayed on the portable display device upon receiving trigger event signals from the operating system of the portable device 110. However, some operating systems do not provide sufficient signaling for all types of user interaction and trigger events may not provide adequate indications as to when an advertisement should or should not be displayed to a user.

The Android® operating system uses Activities to transition within portions of an application. In contrast to the triggering events discussed above, the Android® operating system does not provide a signal indicating that an Activity is terminating. In contrast, the methods discussed below monitor lower level indicators in order to determine when an Activity is finishing.

As used herein, an Activity is an application component that provides a screen with which users can interact in order to do something, such as dial the phone, take a photo, send an email, or view a map. Each Activity is given a window in which to draw its user interface. The window typically fills the screen, but may be smaller than the screen and float on top of other windows. In contrast to an Activity, a service, as discussed above, is a component that runs in the background to perform long-running operations or to perform work for remote processes. A service does not provide a user interface.

An application usually consists of multiple Activities that are loosely bound to each other. One Activity in an application is usually specified as the "main" Activity, which is presented to the user when launching the application for the first time. Each Activity can then start another Activity in order to perform different actions. Each time a new Activity starts, the previous Activity is stopped, but the system preserves the Activity in a processing queue. When a new Activity starts, it is pushed onto the processing queue and takes user focus. The processing queue abides to a basic "last in, first out" queue mechanism, so, when the user is done with the current Activity and presses the Back button, it is popped from the processing queue (and destroyed) and the previous Activity resumes.

Figure 6A:
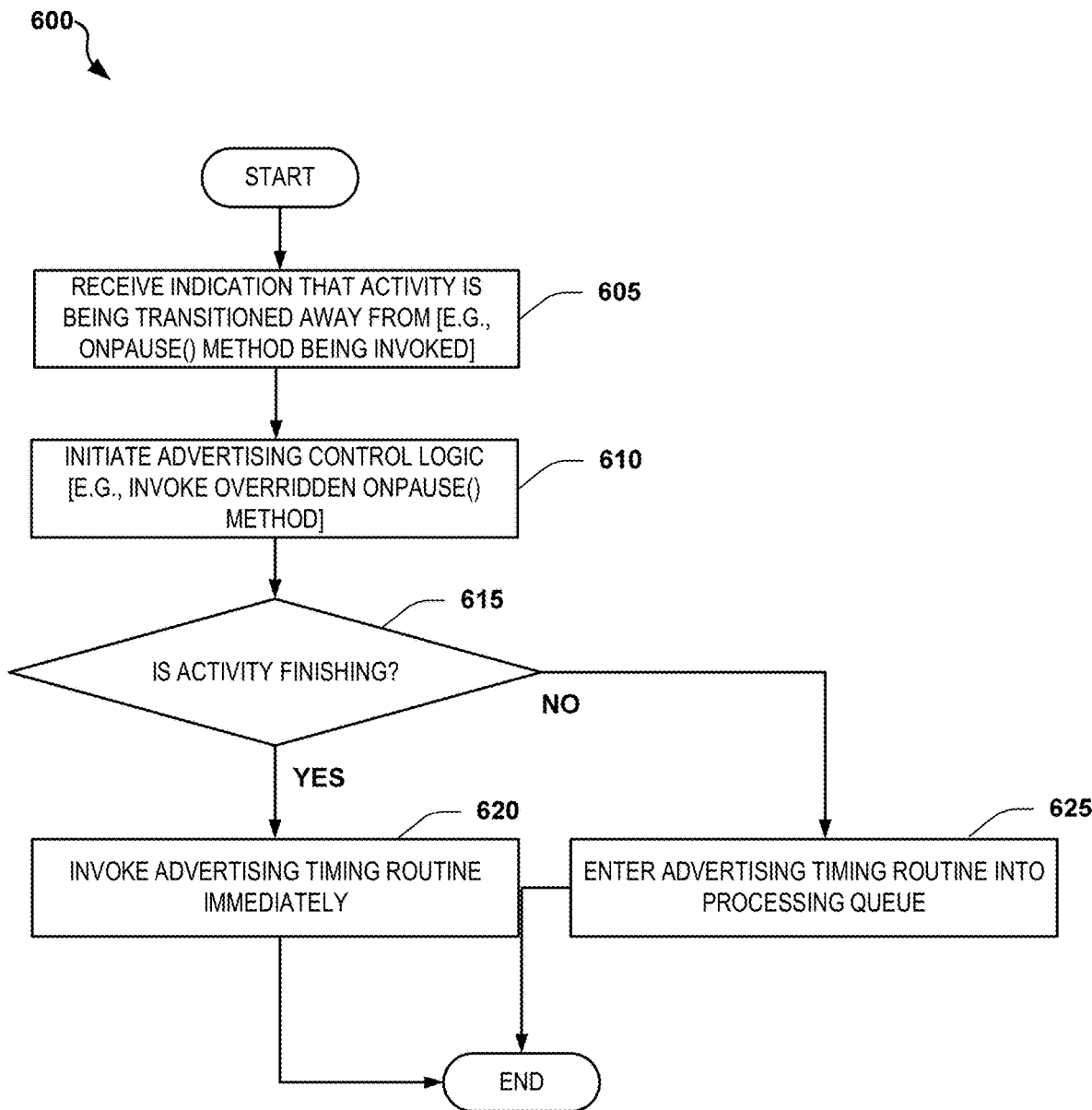
FIGS. 6A, 6B and 6C illustrate an exemplary process for displaying advertisements on a communication device in accordance with the disclosure.

FIG. 6A illustrates an exemplary process 600 for displaying an advertisement on the portable device 110 in embodiments that include an Activity-based operating system such as Android®.

Typically, an Activity can be in one of four states:

Foreground—An Activity that is visible in the foreground and is running.

Paused—An Activity that has lost focus but is still visible. A paused Activity is alive, but can be killed by the system in low memory situations.

Stopped—An Activity is completely obscured by another Activity and is no longer visible to the user so its window is hidden. A stopped Activity maintains all state information. A stopped Activity can be killed by the system when memory is needed elsewhere.

Dropped—An Activity that was either paused or stopped and was killed by the system. A dropped Activity must be completely restarted in order to be displayed again to the user.

The process 600 is concerned with determining when a Foreground Activity transitions to Paused, Stopped or Dropped states. Activities can transition away from the Foreground state as a result of normal software transitions or because of user interaction. In most cases, transitions from the Foreground state are public events. However, in some instances, an Activity can be transitioned away from due to user interaction and the event is not a public event and is not easily detectable. As discussed above, an Activity can be terminated when the user presses the Home button 222, the Back button 224 or by other means. When a user presses the Home button 222 or the Back button 224, in the Android® operating system, there is not a standard way to know that this press resulted in the user leaving the Activity. The process 600 uses a state-tracking methodology that is able to determine that an Activity is finishing. In addition, the process 600 avoids displaying an advertisement if another Activity is started and the user would be annoyed by an advertisement being displayed.

The Android® operating system presents another challenge to displaying advertisements in a timely fashion. When a user hits the Home button 222 on an Android® device, the Android® operating system forces any new Activities to incur a built-in delay of 5 seconds before the new Activity can be executed. This built-in 5-second delay results in an unacceptable user experience for displaying an advertisement. For this reason, a novel process of displaying an advertisement on a phone that uses the Android® operating system was developed. The process 600 leverages Android® views that are created using the WindowManager class instead of Activities for displaying advertisements. The views created using the WindowManager class are not subject to the built-in 5-second delay when a user presses the Home button 222. The process 600 pre-fetches advertisements in order to display the advertisements in a more timely fashion when it is determined that an Activity is finishing.

When an application that utilizes Activities progresses, an Activity could be transitioned away from for several reasons. An Activity could be caused to be transitioned away from by the user pressing the Home button 222, the user pressing the Back button 224, or the Activity being transitioned away from as part of the normal progression of an application. The process 600 determines when an Activity is finishing as opposed to an Activity merely being transitioned away from and returned to the processing queue.

When a user causes an Activity to finish, or when normal transitions within the application cause an Activity to terminate or be returned to the processing queue, the Android® operating system initiates a termination routine called onPause( ). The call to this onPause( ) routine can be used as an indicator that an Activity is being transitioned away from. The onPause( ) routine is used by software developers to deal with steps needed when a user is leaving an Activity or an Activity is at least leaving visibility. The onPause( ) routine can be modified by software developers to perform different functions when Activities are terminating. This modification is referred to as overriding the onPause( ) routine. The process 600 uses an overridden onPause( ) routine to initiate the advertising logic that determines whether it is a proper time to display the advertisement without annoying the user. Other Activity termination indicators, besides the calling of the onPause( ) routine, can be used in the process 600. The process 600 is described as being performed by a client application, e.g., the client application 264 discussed above.

At stage 605, the client application 264 receives an indication of a state transition of an Activity of an application program 266 being executed. The indication can be the initiation of the overridden onPause( ) routine which is invoked when an Activity is being transitioned away from and leaving visibility on the display 250. The transitioning away from the Activity could be caused by the user of the portable device 110 pressing the Home button 222 or the Back button 224 or by a software transition within the operating application. In the Android® operating system, any event causing an Activity to leave visibility is accompanied by a call to the onPause( ) routine.

At stage 610, the client application 264 invokes an advertising control logic routine in response to receiving the indication of the Activity being transitioned away from. In the case of the Android® operating system, the overridden onPause( ) method is automatically invoked when an Activity is being transitioned away from. The cause of Activity transition can be actions taken by the user or normal transitions within the application that is being executed.

One cause of Activity transition that can take place at stage 605 is the press of the Home button 222 in the Android® operating system. The Android® operating system does not generate a public event when the Home button 222 is pressed. Another cause of Activity transition in the Android® operating system is the press of the Back button 224. The pressing of the Back button 224 is accompanied by an event signal, but the Back button 224 event can be a misleading indicator that the Activity of an application is finishing. For example, a user may press the Back button 224 many times within the normal sequence of an application without causing the Activity, and hence the application, to finish. Due to these subtleties, the handling of Tasks and Activities is of central importance to the proper functioning of the process 600. In order to be certain that the Activity of an application is finishing (exiting the application) upon the pressing of the Home button 222, the Back button 224 or transitioning to another Activity within the Task, the overridden onPause( ) method includes a call to a function within the advertising SDK that invokes the advertising control logic that is performed in stages 615, 620 and 625.

At decision block 615, the client application 264 determines if the Activity is finishing by invoking a routine named isFinishing( ). The isFinishing( ) routine interrogates an ActivityManager class (referred to herein as the ActivityManager) of the operating system to determine if the Activity is finishing or running in the background. If the onPause( ) method was invoked as a result of the user pressing the Back button 224, or due to a transition to another software routine, the Activity will be determined to be finishing. If, at decision block 615, the client application 264 determines that the Activity is finishing, the client application 264 causes a first advertising routine to be executed at stage 620.

In contrast to the pressing of the Back button 224 or a software transition, the pressing of the Home button 222 does not cause an Activity to terminate, but instead puts the Activity in an idle state or running in background. Therefore, if the onPause( ) routine (or other indication of a terminating Activity) was caused to be invoked by the pressing of the Home button 222, the isFinishing( ) routine will determine, at decision block 615, that the Activity is not finishing. If the client application 264 (via the isFinishing( ) method) determines that the Activity is not finishing at stage 615, the client application 264 submits a second advertising routine into the processing queue of the operating system at stage 625. The second advertising routine will be executed subsequently when it reaches the top of the processing queue.

Figure 6B:
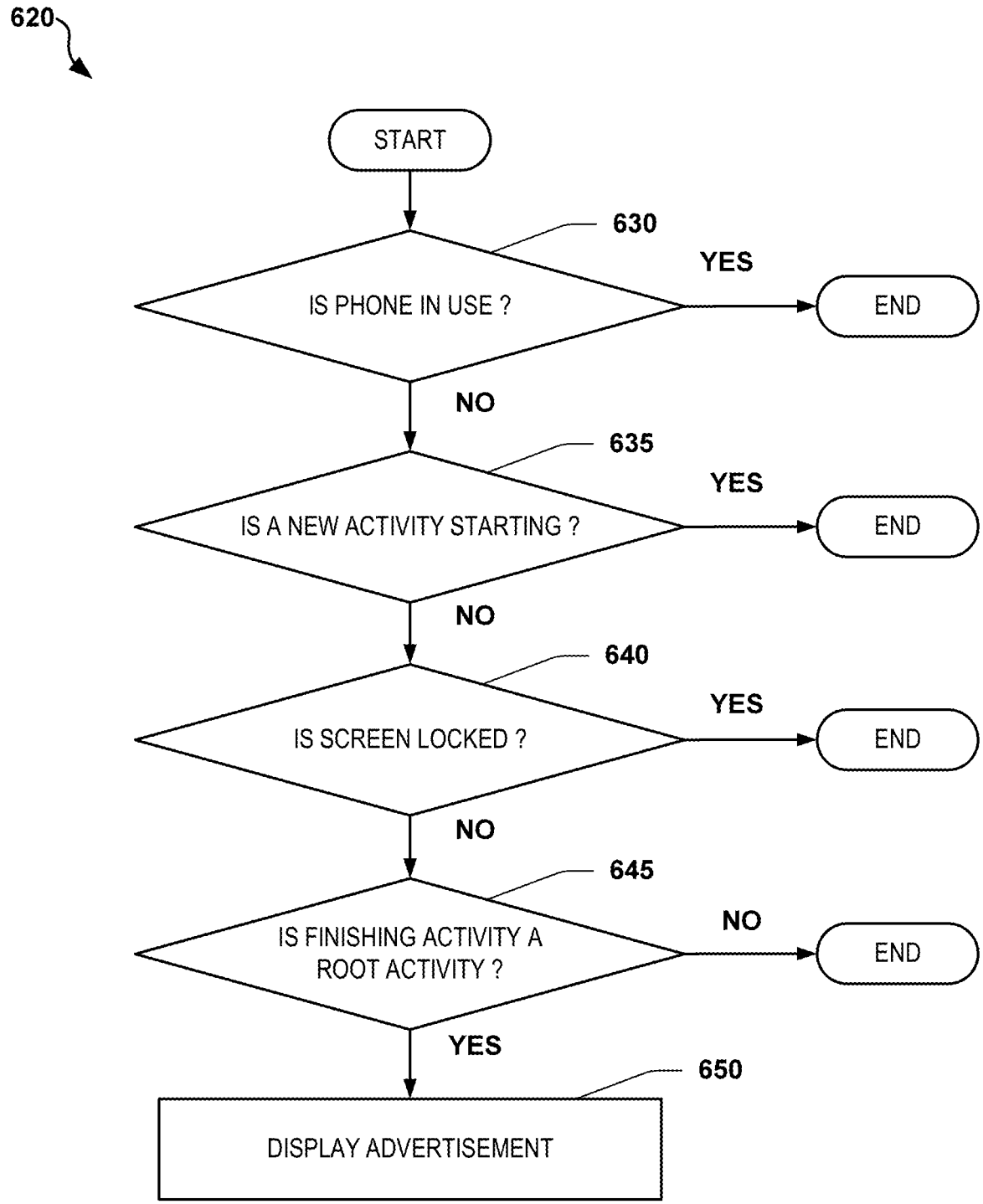

The functions performed at stages 620 and 625 will now be described in reference to FIGS. 6B and 6C. In reference to FIG. 6B, the first advertising routine 620 includes the stages shown. At stage 630, the client application 264 determines if a phone of the portable device 110 is in use, e.g., due to a voice call, a video call, etc. being in progress. If the phone is determined to be in use, the first advertising routine 620 is ended. If the phone is determined not to be in use, the first advertising routine 620 continues to stage 635.

At stage 635, the client application 264 determines if a new Activity was launched and is waiting for a result. A common example of this would be the launching of a camera application within a Task so as to obtain an image from the camera of the portable device 110. If it is determined at stage 635 that a new Activity was launched, the first advertising routine 620 is ended. If it is determined that a new Activity was not launched, the first advertising routine 620 proceeds to stage 640.

At stage 640, the client application 264 determines if the display 250 of the portable device 110 is locked. If it is determined at stage 635 that the display 250 is locked, the first advertising routine 620 is ended. If it is determined that the display 250 is not locked, the first advertising routine 620 proceeds to stage 645.

At stage 645, the client application 264 determines if the finishing Activity is the root Activity. The client application 264 can do this by interrogating the ActivityManager class to determine the current list of Tasks and Activities. If it is determined at stage 645 that the finishing Activity is not the root Activity, the first advertising routine 620 is ended. If it is determined that the finishing Activity is the root Activity, the first advertising routine 620 proceeds to stage 650 and displays the advertisement on the display 250.

The stages shown in the first advertising routine 620 are exemplary only. In some embodiments, one or more of the stages shown in FIG. 6B can be omitted or rearranged. For example, if the portable device 110 does not have a phone or equivalent, the stage 630 can be omitted. In some embodiments, the first advertising routine 620 can be modified to include any one of the decision blocks 630, 635, 640 and 645, any two of the decision blocks 630, 635, 640 and 645, or any three of the decision blocks 630, 635, 640 and 645.

Figure 6C:
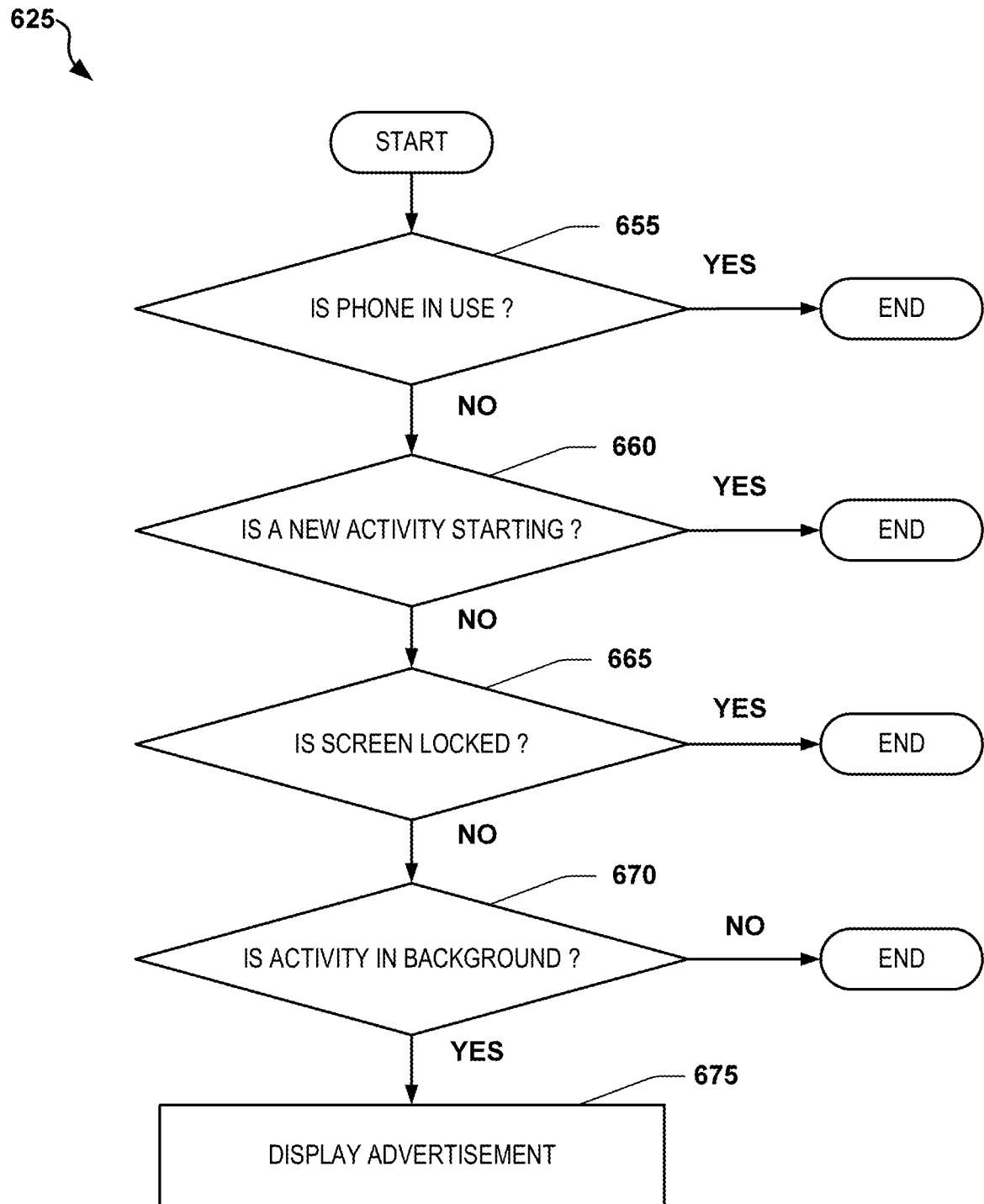

Referring now to FIG. 6C, the second advertising routine 625 includes the stages shown. As discussed above, the second advertising routine 625 is submitted into the queue of the operating system as a result of the Home button 222 being pressed. At stage 655, the client application 264 determines if a phone of the portable device 110 is in use, e.g., due to a voice call, a video call, etc. being in progress. If the phone is determined to be in use, the second advertising routine 625 is ended. If the phone is determined not to be in use, the second advertising routine 625 continues to stage 660.

At stage 660, the client application 264 determines if a new Activity was launched and is waiting for a result. If it is determined at stage 660 that a new Activity was launched, the second advertising routine 625 is ended. If it is determined that a new Activity was not launched, the second advertising routine 625 proceeds to stage 665.

At stage 665, the client application 264 determines if the display 250 of the portable device 110 is locked. If it is determined at stage 665 that the display 250 is locked, the second advertising routine 625 is ended. If it is determined that the display 250 is not locked, the second advertising routine 625 proceeds to stage 670.

At stage 670, the client application 264 determines if the Activity is in the background (in the Paused or Stopped state). The client application 264 can do this by interrogating the ActivityManager class to determine the current list of Tasks and Activities. If it is determined at stage 670 that the Activity is not in the background, the second advertising routine 625 is ended. If it is determined that the Activity is in the background, the second advertising routine 620 proceeds to stage 675 and displays the advertisement on the display 250.

The stages shown in the second advertising routine 625 are exemplary only. In some embodiments, one or more of the stages shown in FIG. 6B can be omitted or rearranged. In some embodiments, the second advertising routine 625 can be modified to include any one of the decision blocks 630, 635, 640 and 645, any two of the decision blocks 630, 635, 640 and 645, or any three of the decision blocks 630, 635, 640 and 645.

As was discussed above, one impediment to a suitable user experience with the Android® operating system is the 5-second delay that is enforced upon Activity launches after the Home button 222 has been pressed. To work around this, a display technique referred to herein as an "Activity-backed Overlay" was devised. The Activity-backed Overlay leverages the Android® WindowManager class addView( ), removeView( ), and updateViewLayout( ) methods to arbitrarily paint Android® View containers (which can hold images, video, web content, etc.) on the display 250. As opposed to an Activity being a task management facility, the WindowManager class functions are a view management facility. Simultaneous to painting one of these Views, the Activity-backed Overlay technique invokes an Activity behind the View on the z-axis of the display 250.

The "backing" Activity is subject to the standard 5-second delay, but the View is not, this enables the technique to display all content (e.g., advertising text, video, audio, etc.) capable of functioning properly without an Activity in the View. When necessary, focus can switch to the Activity. Furthermore, having this z-axis Activity in place enables the Activity-backed Overlay technique to intercept subsequent presses of the Home button 222 and to monitor for transitions to other Activities or Tasks via the Android® operating system's various navigation mechanisms, thus enabling the Activity-backed Overlay technique to remove the View and Activity from the display. In one embodiment, the painting of the View, and the initiation and termination of the View and the Activity is done using Android® WindowManager class functions. The use of the WindowManager class functions requires manual implementation and control of functions that are provided automatically when using Activities, e.g., functionality pertinent to orientation control, video rendering, etc.

Figure 7:
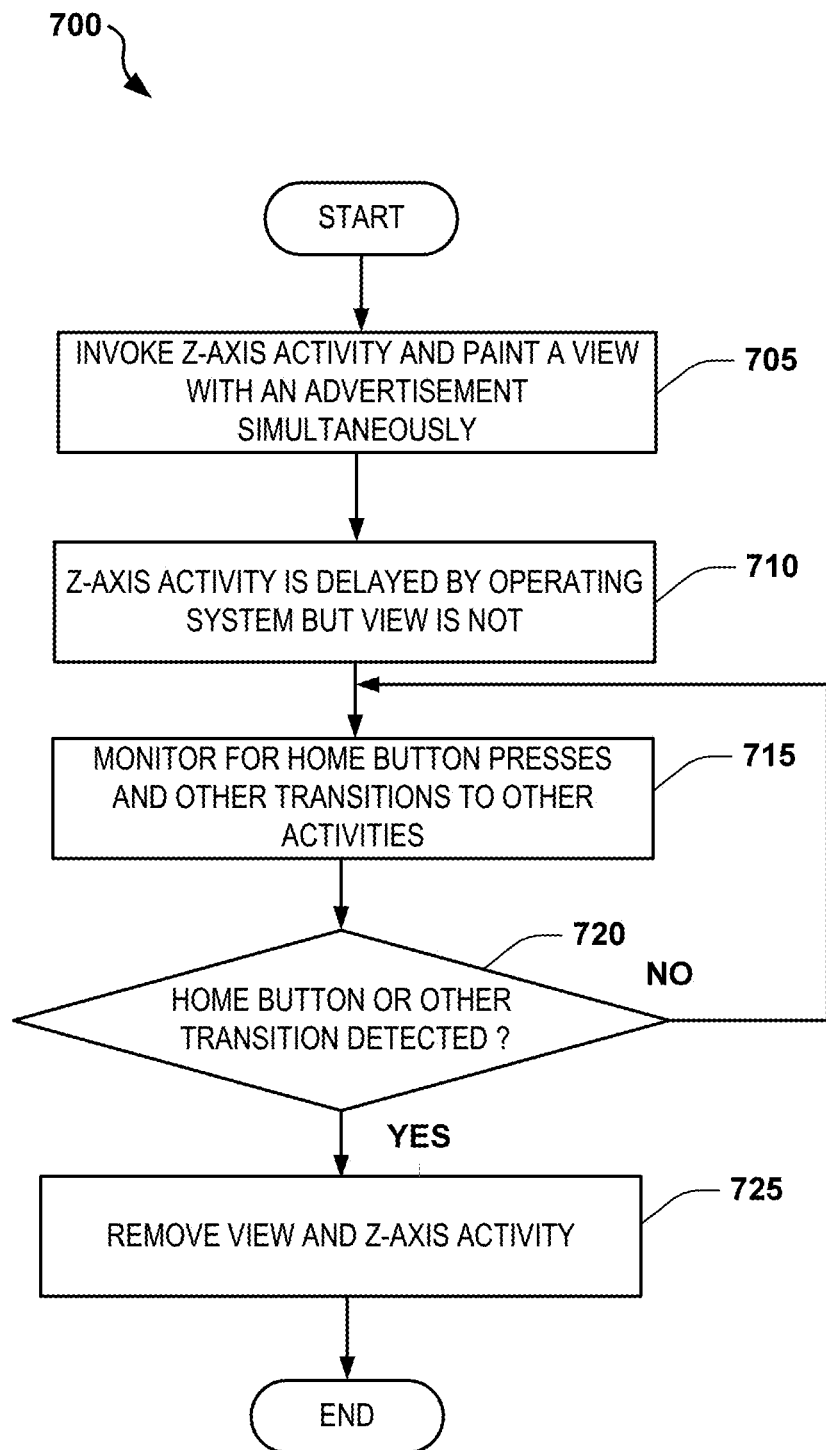
FIG. 7 illustrates another exemplary process for displaying advertisements on a communication device in accordance with the disclosure.

Referring now to FIG. 7, an example process 700 includes the stages shown. The process 700 is an example of the Activity-backed Overlay technique used to display advertisements on the Android® operating system. The process 700 can be used at stages 650 and 675 of the first and second advertising routines 620 and 625, respectively.

The process 700 is invoked when it has been determined using the process 600 discussed above (including the first and second advertising routines 620 and 625) that it is a proper time to display an advertisement. At stage 705, the client application 264 simultaneously (or nearly simultaneously) paints a View on the display 250 and invokes a z-axis Activity behind the View. The addView( ) method of the WindowManager is used to paint the View. The View does not include an Activity so the View is not delayed by the Android® operating system subsequent to a pressing of the Home button 222.

At stage 710, the Android® operating system delays the launching of the z-axis Activity, but the View containing the advertisement is not delayed. At stage 715, the client application 264 monitors for subsequent activations of the Home button 222 and other indications of transitions to other Activities. This is accomplished using the ActivityManager class.

At stage 720, the client application determines if the Home button 222 was activated a second time or another transition was detected. This second Home button 222 activation is subsequent to the Home button 222 press that resulted in the second advertising routine 625 being invoked. This is done to ensure that the operating system does not get hung-up in limbo. If a positive detection occurs at stage 720, the process 700 proceeds to stage 725 where the client application removes both the View and the z-axis Activity. This is done because it would be inappropriate to continue to display the advertisement when the user is invoking other Activities or Tasks. If no Home button 222 press or other transition is detected at stage 720, the process 700 loops back to stage 715 where the client application continues to monitor for Home button 222 activation and other transitions.

During the 5 second delay, nothing is monitoring for home button presses. During this delay period, the Home button 222 does not function. The Android® operating system prevents any Activity from being executed during this 5 second delay period. The Back button 224 retains functionality during the 5 second delay period. Activation of the Back button 224 will cause the advertisement to be exited. In some embodiments, the View includes a soft-button and the user can exit the advertisement by pressing the soft button. The Home button 222 will not work until the z-axis Activity launches. After the 5-second delay has expired, the z-axis Activity is launched and the z-axis Activity performs the monitoring at stage 715.

In addition to monitoring for Home button 222 presses and other transitions at stage 715, the z-axis Activity also monitors for user interaction with the View advertisement. If the user interacts with the View (e.g., requests more information, downloads images, videos, etc.), the z-axis Activity detects these interactions and invokes the appropriate routines. The z-axis Activity can be configured to terminate itself and the View after a pre-determined period of time.

The process 700 is exemplary only and other process can include more stages, omit stages and perform the stage in different orders.

The Activity-backed Overlay technique represented by the process 700 advantageously enables the rendering of media content on the display 250 immediately after a predefined user interaction with the device user interface such as, for example, pressing or other selection of the Home button 222. The process 700 also contemplates hooking back properly to system events such as, for example, subsequent presses of the Home button 222 in order to dismiss the media content from the display 250.

In other embodiments additional techniques may be employed to dismiss an Activity-backed Overlay once it has been inferred that a user is engaged in an attempt to dismiss displayed media content. In one implementation the operating system is monitored to detect an additional predefined user interaction with the device's user interface such as, for example, a second press of the Home button 222. However, detection of this second press of the Home button 222 is done differently, since the original app/Activity lifecycle has progressed. Accordingly, in this implementation the program code of the advertising application 264 ties into the lifecycle of the backing Activity to appropriately detect the second press of the Home button 222. Upon detecting the second press of the Home button 222, a timer is started. The duration of the timer may be coextensive with the 5 second delay period implemented by the Android® operating system which, again, prevents any Activity from being executed during this delay period. As is discussed below with reference to FIGS. 8A-8B, the use of such a timer enables the Activity-based Overlay to be appropriately dismissed without negatively affecting the user experience.

Figure 8A:
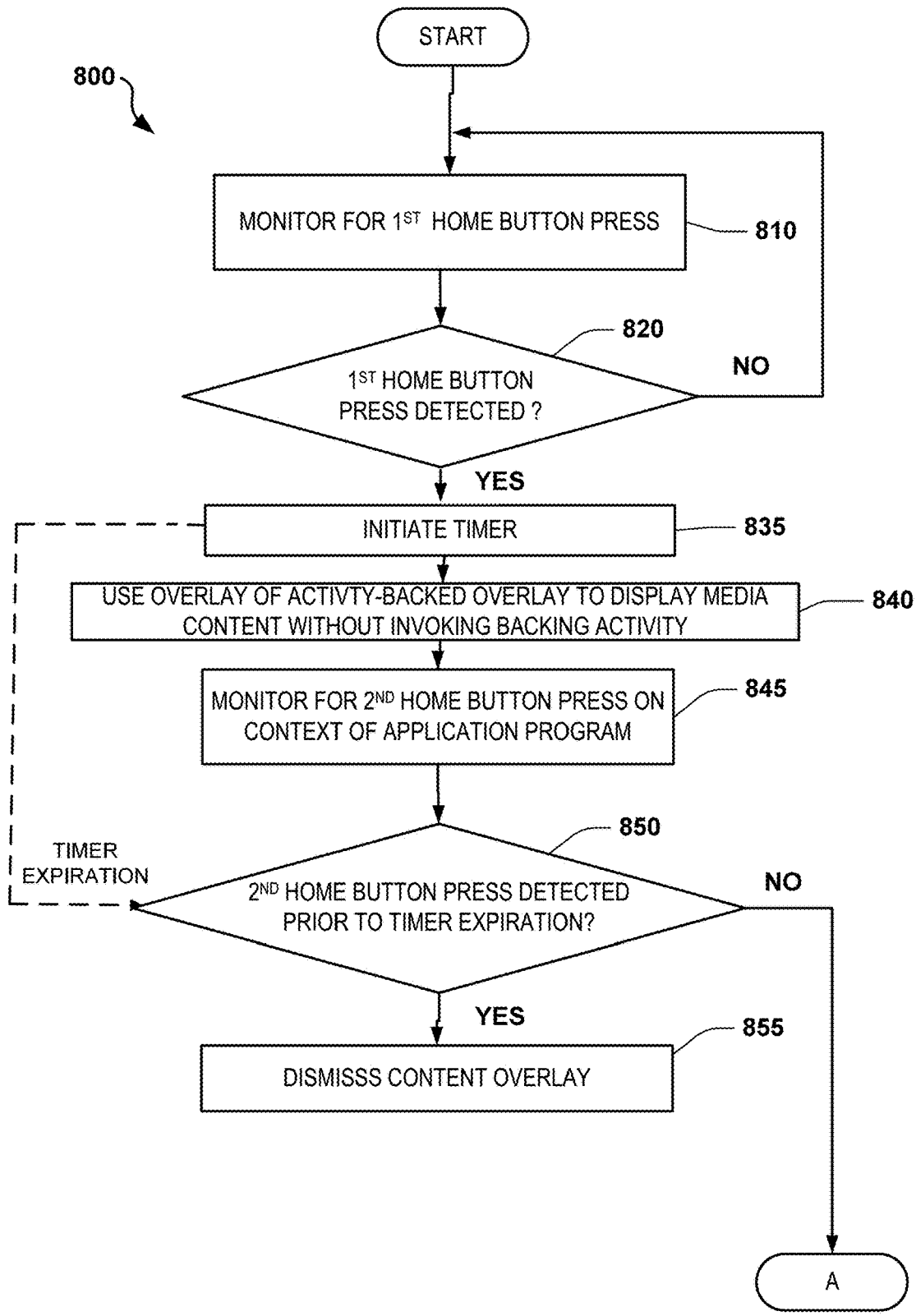
FIGS. 8A and 8B collectively represent an alternate Activity-backed Overlay process in accordance with the disclosure.
Figure 8B:
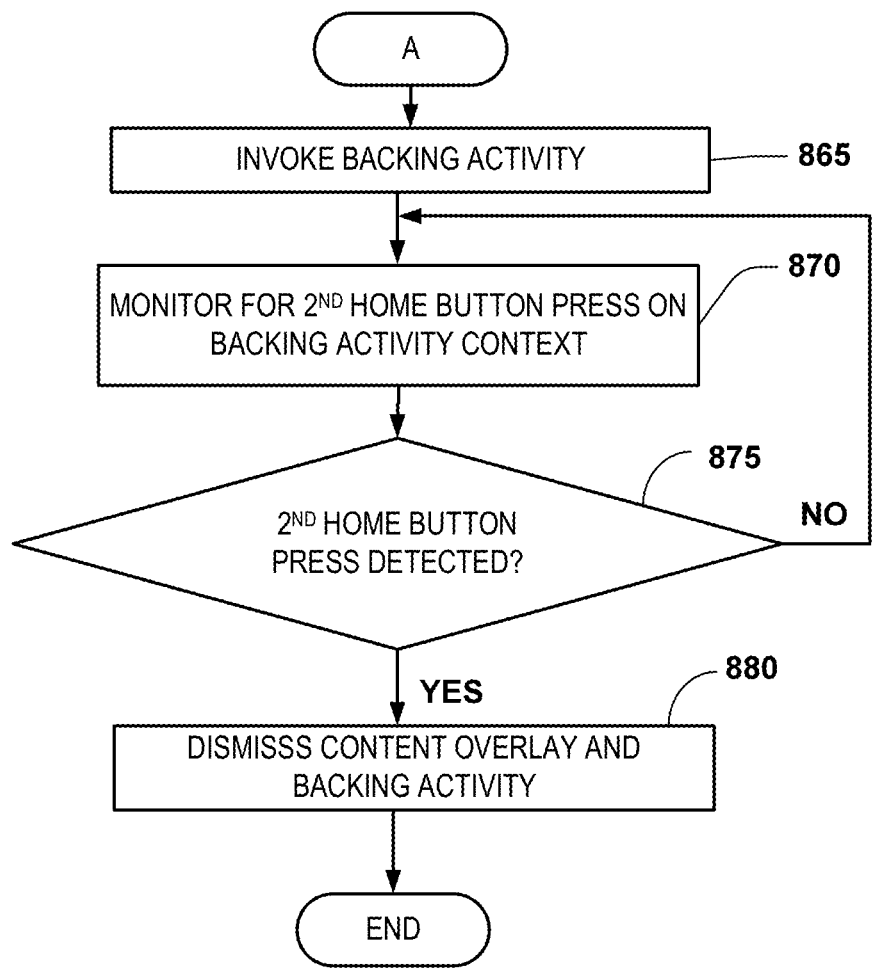

Attention is now directed to FIGS. 8A and 8B, which collectively form a flowchart representing an alternate Activity-backed Overlay process 800 in accordance with the disclosure. The process 800 is an example of the Activity-backed Overlay technique used to display media such as advertisements through a user interface of an electronic device configured with the Android® operating system. The process 800 can be used at stages 650 and 675 of the first and second advertising routines 620 and 625, respectively, and is implemented by the program code of the client application 264.

As shown in FIG. 8A, the process 800 includes monitoring for an initial user interaction with the device user interface (stage 810). In one embodiment this initial user interaction may be, for example, an initial press of the Home button 222. Such an initial press of the Home button 222 may be detected (stage 820) by the program code of the client application 264 through monitoring of the Android Activity lifecycle as described above or through use of the other detection techniques described herein. Upon detection of the initial press of the Home button 222 (stage 820), the program code of the client application 264 initiates a timer (stage 835). The timer will typically be configured to have a predefined duration coextensive with the 5 second delay period utilized by the Android operating system following a press of the Home button 222. An Overlay of an Activity-backed Overlay is then used to the display the media content without invoking the backing Activity (stage 840). As discussed previously, such an Overlay may be created by leveraging the Android® WindowManager class to display the media content.

During display of the media content, the program code of the client application 264 monitors the context of the application program 266 in order to detect a subsequent, second press of the Home button 222 (stage 845). This may be effected by, for example, monitoring of the Android® Activity lifecycle on the context of the currently active application program 266 (as described above), or through use of the other detection techniques described herein. If the second press of the Home button 222 is detected prior to expiration of the predefined duration of the timer (stage 850), the Overlay containing the media content is dismissed and the display of the media content is thus terminated (stage 855).

Referring to FIG. 8B, if the second press of the Home button 222 is not detected prior to expiration of the predefined duration of the timer, the backing Activity of the Activity-backed Overlay containing the displayed media content is invoked (stage 865). The program code then monitors the context of the backing Activity in order to detect a subsequent, second press of the Home button 222 (stage 870). This may be effected by, for example, monitoring of the Android® Activity lifecycle on the context of the backing Activity or through use of the other detection techniques described herein. Once the second press of the Home button 222 is detected (stage 875), the Activity-backed Overlay containing the displayed media content is dismissed (stage 880).

Broadcast Receiver

An alternate approach to detecting pressing of the Home button 222 involves registering an Android® broadcast receiver. By registering an Android BroadcastReceiver with IntentFilter of ACTION_CLOSE_SYSTEM_DIALOGS, a signal may be received from the Android® operating system whenever the Home button 222 is pressed. This does not involve monitoring the Android® Activity lifecycle, and is generally a one-step process. Upon receiving this signal, an Overlay containing the desired media content (e.g., an advertisement) may be created (e.g., by leveraging the Android® WindowManager class) and displayed. Advantageously, no subsequent Activity is required to intercept additional Home button presses in order to determine when to dismiss the Overlay containing the media content. Rather, the program code of the client application 264 can be configured to simply again use the BroadcastReceiver to again listen for the same broadcast signal to occur again.

To summarize, an exemplary process for using a broadcast receiver to unobtrusively display media content on a communication device configured with the Android® operating system may be characterized by the following operations: (i) registering a BroadcastReceiver, (ii) receiving, through the BroadcastReceiver, a signal indicating a first Home button press has occurred, (iii) presenting an Overlay by, for example, leveraging the Android® WindowManager class, (iv) receiving, through the BroadcastReceiver, a signal indicating an additional Home button press has occurred, and (v) removing the Overlay.

Alternate Mechanism to Detect Backgrounding

As has been previously discussed, because mobile operating systems of interest do not directly provide signals indicating that an application is transitioning to the background, in exemplary embodiments this state is deduced from multiple inter-related data points. In one embodiment, the desired transition is recognized with high certainty by inspecting the operating system's memory state when any transition occurs. Specifically, where the operating system provides status callbacks regarding memory state, it is possible to monitor these callbacks and add their state to the list of parameters considered when determining whether backgrounding has occurred.

For the Android® operating system, the onTrimMemory( ) callback may be used to provide at least an indication that a Home button press may have occurred. In brief, the onTrimMemory( ) callback provides signals relating to how an application is being treated in system memory, e.g., where it is on the stack, whether it's being backgrounded, terminated, and the like. In particular, the TRIM_MEMORY_UI_HIDDEN signal indicates that an application is being backgrounded, and coupled with other indicators can provide certainty that an application has backgrounded following a Home button press. Accordingly, in one embodiment the monitoring process implemented by the program code of the client application 264 listens for the onTrimMemory( ) callback, inspects its return values, and notes the presence of ComponentCallbacks2.TRIM_MEMORY_UI_HIDDEN. In this way an initial press of the Home button 222 associated with backgrounding of an application program 266 may be detected.

The program code of the client application 266 is also preferably configured to monitor for and handle any subsequent press of the Home button 222 to ensure the media content included in an Overlay is dismissed in a timely manner and that its presentation does not "hang up" the display. The onTrimMemory( ) callback may also be used in detecting a subsequent press of the Home button 222. However, this callback is preferably used differently than it was used to in the detecting the original press of the Home button 222. For detection of the original press of the Home button 222, onTrimMemory( ) is used in the context of the Activity or Activities of an active application program 266. For subsequent presses of the Home button 222, onTrimMemory( ) is preferably used in the context of the "z-axis" or "backing" Activity initiated by the program code of the client application 264. Moreover, because the Android® operating system a) delays backing Activity launch after Home button press by 5 seconds, and b) will actually prevent the backing Activity from launching if the subsequent Home button press occurs before those 5 seconds have elapsed, onTrimMemory( ) is paired with a discrete timer. This pairing permits it to be determined with certainty 1) that onTrimMemory( ) is signaling within the proper context, and 2) whether the value returned means the backing Activity has been preempted.

Figure 9:
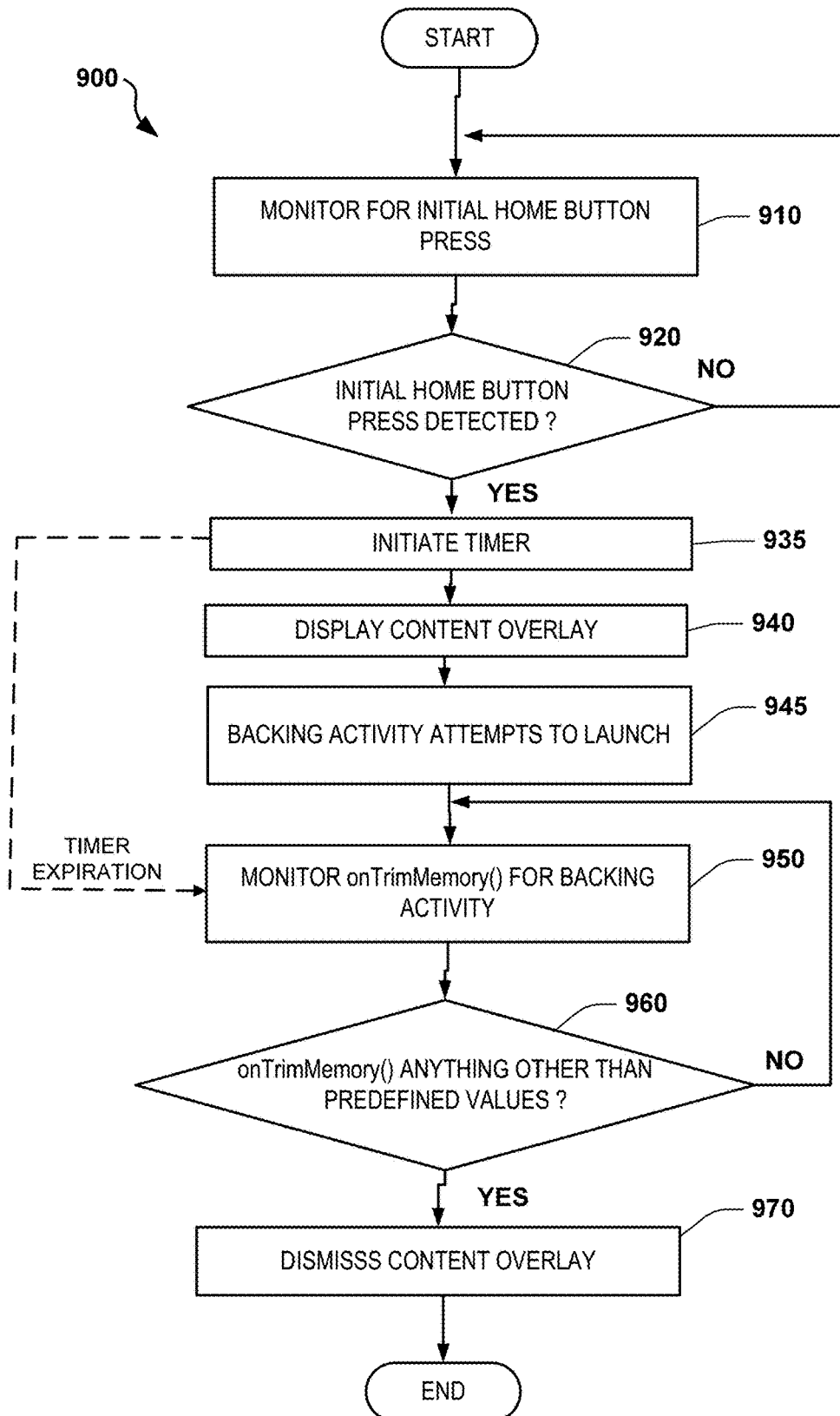
FIG. 9 is a flowchart depicting an alternate process to detect backgrounding of an application in accordance with the disclosure.

Attention is now directed to FIG. 9, which is a flowchart depicting an alternate process 900 to detect backgrounding of an application in accordance with the disclosure. The process 900 includes monitoring for an initial user interaction with the device user interface (stage 910). In one embodiment this initial user interaction may be, for example, an initial press of the Home button 222. Such an initial press of the Home button 222 may be detected (stage 920) by the program code of the client application 264 through monitoring of the Android® Activity lifecycle as described above or through use of the other detection techniques described herein. Upon detection of the initial press of the Home button 222 (stage 920), the program code of the client application 264 initiates a timer (stage 935). The timer will typically be configured to have a predefined duration coextensive with the 5 second delay period utilized by the Android operating system following a press of the Home button 222. An Overlay of an Activity-backed Overlay is then used to the display the media content without invoking the backing Activity (stage 940). As discussed previously, such an Overlay may be created by leveraging the Android® WindowManager class to display the media content.

As shown in FIG. 9, upon display of the Overlay containing the desired media content, the backing Activity generated by the program code of the client application 264 and associated with the Overlay attempts to launch (stage 945). Again, the Android® operating system is configured to delay, by 5 seconds, launch of the backing Activity following pressing of the Home button 222. In addition, the Android® operating system will prevent the backing Activity from launching if a subsequent Home button press occurs before those 5 seconds have elapsed. Accordingly, the program code of the client application 264 is configured to monitor onTrimMemory( ) for the backing Activity and to be informed of expiration of the timer (stage 950). Once the timer has expired, this monitoring continues until the value of onTrimMemory( ) for the backing Activity becomes anything other than one of a set of predefined values (stage 960). In one embodiment this set of predefined values consists of TRIM_MEMORY_RUNNING_MODERATE, TRIM_MEMORY_RUNNING_LOW, or TRIM_MEMORY_RUNNING_CRITICAL. Once the value of onTrimMemory( ) becomes one of these predefined values, the content Overlay containing the media content is dismissed in order to ensure the Overlay does not interfere with use of the communication device (stage 970).

Native User Interface Elements

Display of media content such as advertising on mobile devices is most effective not only when it is unobtrusive, but when it is displayed clearly within the context of the user's experience. Mobile advertising entirely divorced from the user's most recent experience is mentally jarring, and therefore less likely to result in user engagement. Users' sense of continuity is greatly heightened when mobile advertising incorporates elements of the user interface (UI) associated with their most recent experience. To that end, in one embodiment UI elements of a user application containing media content (e.g., an advertisement) are incorporated within the media content itself. This incorporation may occur in many ways; however, a typical manifestation would involve providing a border or graphical wrapper around the media content (e.g., advertisement) that mimics the color palette and/or image elements of the user application that the media content is associated with. Additionally, text may be used to strengthen the association, incorporating messaging such as "Thanks for using Application X! This session brought to you by: [name of advertiser]"

Figure 10:
FIG. 10 is a screen shot of an exemplary advertisement incorporating elements of a user interface of a containing application associated with the advertisement.

Referring to FIG. 10, a screen shot is provided of an exemplary advertisement incorporating elements of the UI of a containing user application associated with the advertisement. As shown, an application icon 1010 and a sponsorship message 1020 associated with the containing application borders the advertisement 1030.

Auto-Dismissal of Advertisements

As indicated above, an important feature of the user experience facilitated by embodiments of the present system is the ability of the user to quickly and easily dismiss undesired advertising. When combined with the naturally unobtrusive timing of advertisement display enabled by the present system, user distraction and annoyance is minimized. This increases the likelihood of a given user's engagement with future advertising piquing their interest. To this end, embodiments of the present system can be configured to dismiss any given displayed ad with no user interaction. This can be implemented in many way; however, a typical manifestation comprises use of a countdown timer, measured in seconds, which auto-dismisses any ad the user has chosen not to engage with after a pre-determined time.

Rich Media Handling

The use of Rich Media in mobile advertising is facilitated by digital advertisements which have been constructed to allow and encourage interaction by the user. In contrast, traditional display and video advertising is passive in nature; that is, the user is either viewing a static web page or image, or watching video content. Rich Media incorporates clickable/touchable elements such as information forms, 360-degree pan- or rotatable models & images, mini games, and the like. Because Rich Media enables users to interact with the product being advertised within the ad experience in some way, it has been found to be much more effective at eliciting desired actions and results. Consequently, enabling Rich Media advertisements to be presented in a way that does not interference with the experience of users is of importance to mobile advertisers.

MRAID and HTML5 have emerged as the dominant standards for Rich Media advertisements. Both of these formats rely heavily upon (and assume the presence of) functionality provided by Activities when running on the Android® operating system. However, as previously noted the Android® operating system does not permit Activities to launch during the 5-second delay period following selection of the Home button, thus precluding the used of conventional Activity-based display of Rich Media content during this delay period.

In order to enable Rich Media content to be displayed during this 5-second delay period, it is proposed to display the Rich Media content in an Activity-backed Overlay. Since the backing Activity of such an Activity-backed Overlay is prevented by the Android® operating system from launching until expiration of the 5-second delay period, several workarounds have been developed in order to enable the display of Rich Media content during this delay period. These workarounds, which in one embodiment may be implemented by leveraging Java reflection and other advanced techniques, are configured to a) provide functionality which normally would be provided by an Activity, and b) delay certain types of user interaction until the 5-second delay period and the backing Activity becomes available for use subsequent to the delay period. As is discussed below, implementation of these workarounds may involve (i) injecting Activity Context into the Overlay, (ii) enabling Rich Media features to be supported by the Overlay in combination with the injected Context, and disabling or delaying features which strictly require an Activity, and (iii) swapping, by using Java reflection, the injected Context into the backing Activity of the Activity-backed Overlay once it becomes available after expiration of the 5-second delay period.

Figure 11A:
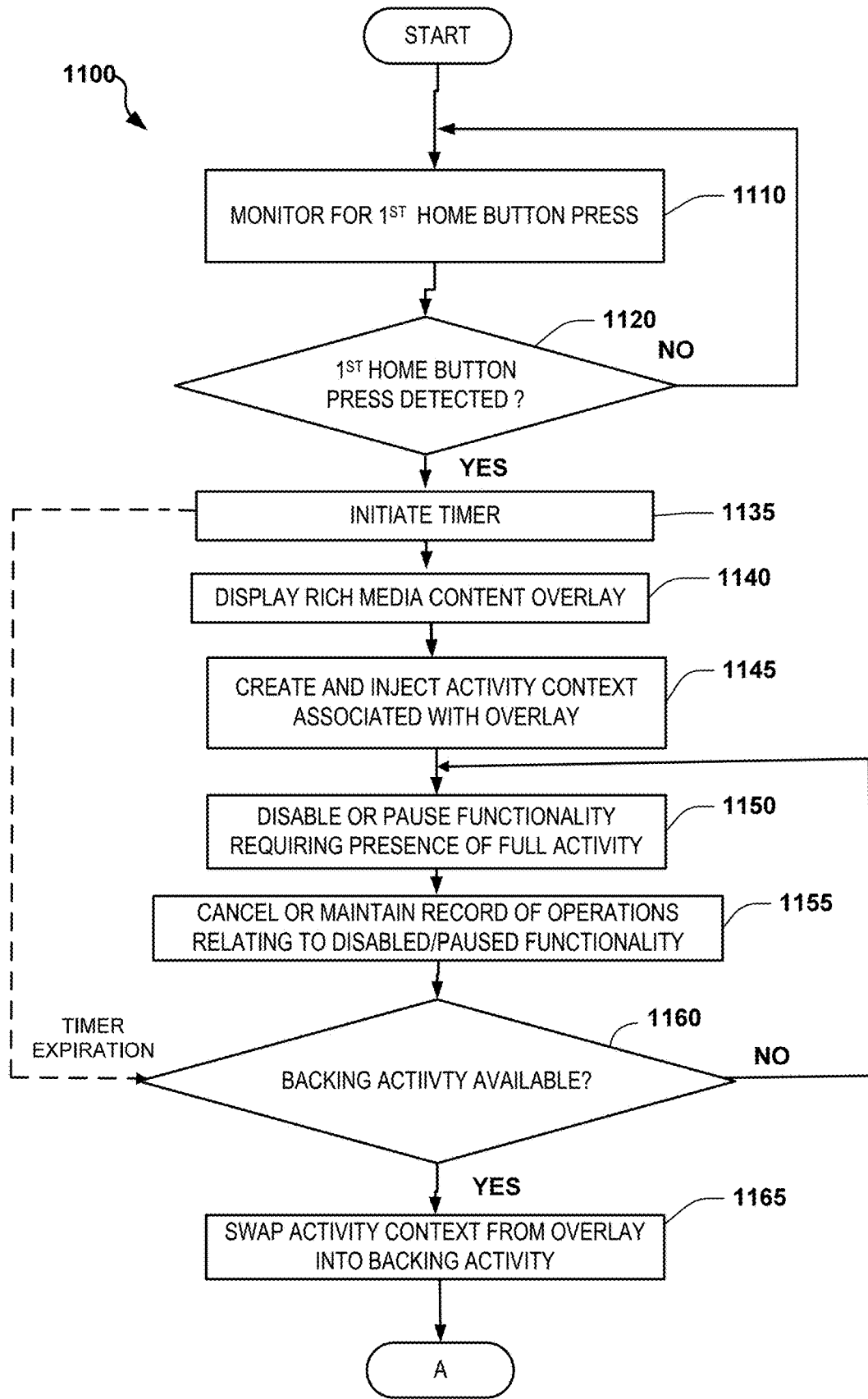
FIGS. 11A and 11B collectively provide a flowchart representing a process for displaying Rich Media content in accordance with the disclosure.
Figure 11B:
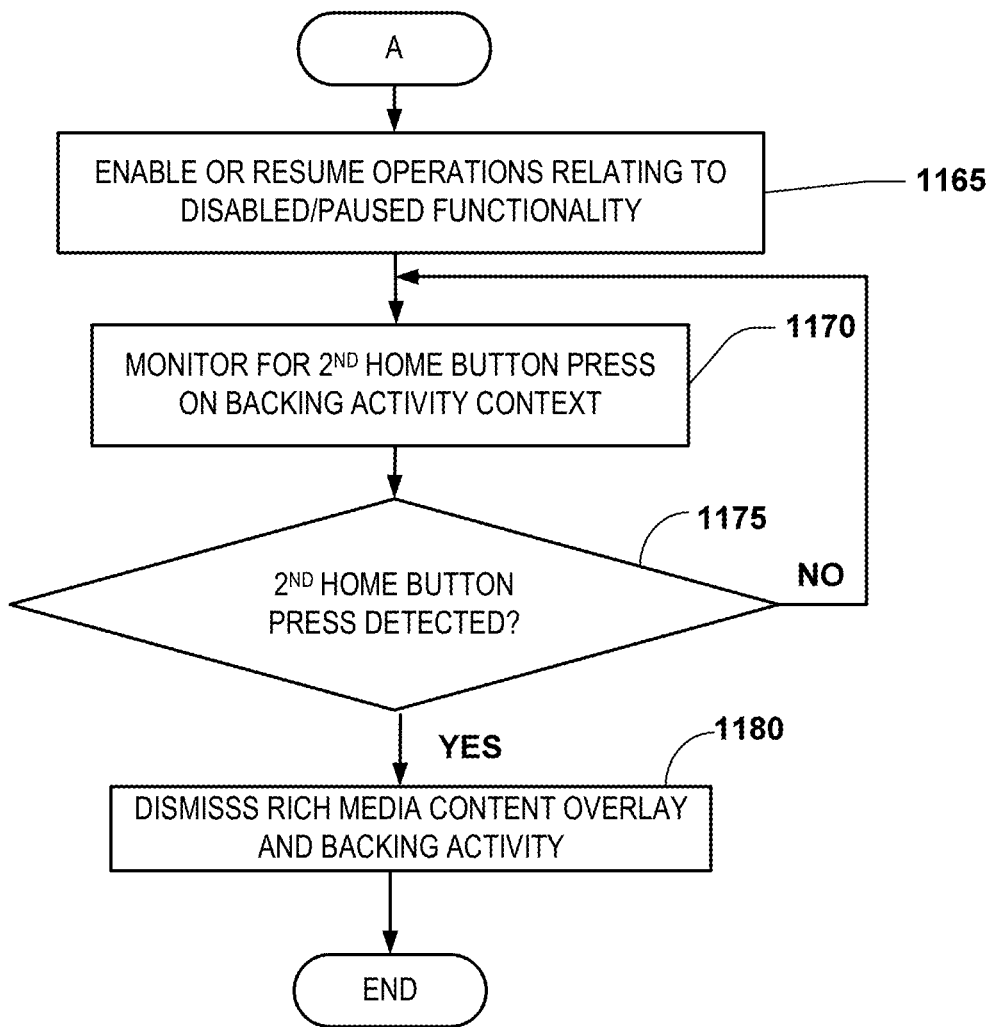

Attention is now directed to FIGS. 11A and 11B, which collectively provide a flowchart representing a process 1100 for displaying Rich Media content in accordance with the disclosure. The process 1100 includes monitoring for an initial user interaction with the device user interface (stage 1110). In one embodiment this initial user interaction may be, for example, an initial press of the Home button 222. Such an initial press of the Home button 222 may be detected (stage 1120) by the program code of the client application 264 through monitoring of the Android® Activity lifecycle as described above or through use of the other detection techniques described herein. Upon detection of the initial press of the Home button 222 (stage 1120), the program code of the client application 264 initiates a timer (stage 1135). The timer will typically be configured to have a predefined duration coextensive with the 5 second delay period utilized by the Android operating system following a press of the Home button 222. An Overlay of an Activity-backed Overlay is then used to the display the Rich Media content without invoking the backing Activity (stage 1140). As discussed previously, such an Overlay may be created by leveraging the Android® WindowManager class to display the media content.

In addition to displaying the Rich Media content via an Overlay, the program code also creates and injects an Activity Context into the Android Webview displaying the Rich Media content (stage 1145). This occurs even before the backing Activity associated with the Overlay becomes available following the 5-second delay period imposed by the Android® operating system. The "Context" created during this stage corresponds to an abstract Android® class which can be concretely implemented by both applications as a whole, and individually for their constituent Activities (https://developer.android.com/reference/android/content/Context). Accordingly, the program code is configured to concretely implement a new Context scoped to a backing Activity associated with the Overlay even before such backing Activity exists.

Referring again to FIG. 11A, the process 1100 further includes disabling or pausing functionality inherent within the Rich Media content requiring the support of an Activity (stage 1150). This may be accomplished by utilizing various hooks, triggers, and UX features designed to determine when the user is trying to perform an action with respect to the displayed Rich Media content that relies on an Activity. These detected user actions may simply be canceled/disabled, or alternatively they may be paused and delayed until such time as the backing Activity becomes available (stage 1155). In one embodiment the "disable" and "pause" operations may be accomplished by having a list of functions/method calls/etc. which are disallowed, listening for occurrences of those items, and either canceling them or wrapping them in a timer or other mechanism which effectively prevents them from actually happening until the 5-second delay period has expired. As an example, a component of the Rich Media content allowing touch-and-drag functionality could be recognized, and the operating system signals normally associated with such touch-and-drag functionality could be blocked until the backing Activity becomes available (stage 1160).

Once the backing Activity becomes available (stage 1160), the Activity Context previously created is swapped by the program code of the client application 264 into the backing Activity (stage 1165). Because this Context is "floating", in one embodiment its state is scraped via Java reflection in order to effect this swap. In addition, operations which have been disabled or paused (stage 1155) are enabled or resumed upon the backing Activity becoming available (stage 1165). The program code then monitors the context of the backing Activity in order to detect a subsequent, second press of the Home button 222 (stage 1170). This may be effected by, for example, monitoring of the Android® Activity lifecycle on the context of the backing Activity or through use of the other detection techniques described herein. Once the second press of the Home button 222 is detected (stage 1175), the Activity-backed Overlay containing the displayed media content is dismissed (stage 1180).

It is noted that in various embodiments the present invention may relate to processes such as are described or illustrated herein and/or in the related applications. These processes may be implemented on the host system 140 on one or more host system servers 370 by one or more host system applications 364, as well as one or more portable devices 110 by one or more client applications 264. These processes are typically implemented in one or more modules comprising systems as described herein and/or in the related applications, and such modules may include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

It is noted that in various embodiments the present invention may relate to processes such as are described or illustrated herein and/or in the related applications. These processes may be implemented on the host system 140 on one or more host system servers 370 by one or more host system applications 364, as well as one or more portable devices 110 by one or more client applications 264. These processes are typically implemented in one or more modules comprising systems as described herein and/or in the related applications, and such modules may include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

As noted, some embodiments of the present invention may include computer software and/or computer hardware/software combinations configured to implement one or more processes or functions associated with the present invention such as those described above and/or in the related applications. These embodiments may be in the form of modules implementing functionality in software and/or hardware/software combinations. Embodiments may also take the form of a computer storage product with a computer-readable medium having computer code thereon for performing various computer-implemented operations, such as operations related to functionality as described herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASIC s"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of displaying media content through a user interface of a communication device, the communication device including a processor, a memory including program code, an application program, and an Activity-based operating system wherein the application program uses a plurality of Activities associated with a plurality of display windows, the method comprising:
receiving an indication of a state transition of a first Activity of the plurality of Activities; and
executing, by the processor and in response to the indication, the program code in order to:
detect, by monitoring the Activity-based operating system, a first user interaction with the user interface wherein the monitoring includes inspecting a first operating system method called in relation to the first Activity;
determine whether the first Activity is finishing based at least in part on the detection of the first user interaction with the user interface;

initiate a timer upon determining the first Activity is finishing;
display, upon determining the first Activity is finishing, the media content upon a display of the user interface by displaying an overlay of an activity-backed overlay without invoking a backing activity of the activity-backed overlay;
determine, upon expiration of the timer, that a second user interaction with the user interface has not occurred by monitoring a context of the application program;
invoke, upon determining that the second user interaction with the user interface has not occurred, the backing Activity behind the media content on a z-axis of the display;
detect, by monitoring the Activity-based operating system subsequent to the expiration of the timer, the second user interaction with the user interface wherein the monitoring the Activity-based operating system subsequent to the expiration of the timer includes inspecting a second operating system method called in relation to the backing Activity; and
terminate the displaying of the media content upon the detection of an occurrence of the second user interaction.

2. The method of claim 1 wherein the first user interaction corresponds to an initial selection of a predefined element of the user interface and wherein the second user interaction corresponds to a subsequent selection of the predefined element of the user interface.

3. The method of claim 2 wherein the predefined element of the user interface is a Home button.

4. The method of claim 1 wherein the first operating system method corresponds to an onTrimMemory method and wherein the program code to detect the first user interaction includes program code to inspect a value of the onTrimMemory method.

5. The method of claim 4 wherein the code to inspect includes code to identify TRIM_MEMORY_UI_HIDDEN as the value.

6. The method of claim 1 wherein the second operating system method corresponds to an onTrimMemory method and wherein the program code to detect the second user interaction includes program code to inspect a value of the onTrimMemory callback.

7. The method of claim 1 wherein:
the first operating system method corresponds to a first onTrimMemory method and the program code to detect the first user interaction includes program code to inspect a value of the first onTrimMemory callback; and
the second operating system method corresponds to a second onTrimMemory method and the program code to detect the second user interaction includes program code to inspect a value of the second onTrimMemory method.

8. The method of claim 4 wherein the code to inspect includes code to determine whether the value of the onTrimMemory method is one of TRIM_MEMORY_RUNNING_MODERATE, TRIM_MEMORY_RUNNING_LOW, or TRIM_MEMORY_RUNNING_CRITICAL.

9. The method of claim 8 wherein the code to terminate the display is executed when the value of the onTrimMemory method is other than TRIM_MEMORY_RUNNING_MODERATE, TRIM_MEMORY_RUNNING_LOW, or TRIM_MEMORY_RUNNING_CRITICAL.

10. The method of claim 1 wherein the timer is configured to time out upon expiration of a predefined delay period.

11. A communication device comprising:
a processor;
a display; and
a memory coupled to the processor, the memory containing program code, an application program, and
an Activity-based operating system wherein the application program uses a plurality of Activities associated with a plurality of display windows, wherein the program code, when executed by the processor, causes the processor to:
receive an indication of a state transition of a first Activity of the plurality of Activities; and
execute, in response to the indication, the program code in order to:
detect, by monitoring the Activity-based operating system, a first user interaction with a user interface wherein the monitoring includes inspecting a first operating system method called in relation to the first Activity;
determine whether the first Activity is finishing based at least in part on the detection of the first user interaction with the user interface;
initiate a timer upon determining the first Activity is finishing;
display, upon determining the first Activity is finishing, media content upon a display of the user interface by displaying an overlay of an activity-backed overlay without invoking a backing activity of the activity-backed overlay wherein upon the displaying the overlay the backing activity attempts to launch;
detect, by monitoring the Activity-based operating system subsequent to expiration of the timer, a second user interaction with the user interface wherein the monitoring the Activity-based operating system subsequent to the expiration of the timer includes inspecting a value of a second operating system method called in relation to the backing Activity; and
terminate the displaying of the media content when the value of the second operating system method becomes one of multiple predefined values in a predefined set of values.

12. The communication device of claim 11 wherein the first user interaction corresponds to an initial selection of a predefined element of the user interface and wherein the second user interaction corresponds to a subsequent selection of the predefined element of the user interface.

13. The communication device of claim 12 wherein the predefined element of the user interface is a Home button.

14. The communication device of claim 11 wherein the first operating system method corresponds to an onTrimMemory method and wherein the program code to detect the first user interaction includes program code to inspect a value of the onTrimMemory method.

15. The communication device of claim 14 wherein the program code to inspect includes code to identify TRIM_MEMORY_UI_HIDDEN as the value.

16. The method of claim 11 wherein the second operating system method corresponds to an onTrimMemory method and wherein the program code to detect the second user interaction includes program code to inspect a value of the onTrimMemory callback.

17. The communication device of claim 11 wherein:
the first operating system method corresponds to a first onTrimMemory method and the program code to detect the first user interaction includes program code to inspect a value of the first onTrimMemory callback; and the second operating system method corresponds to a second onTrimMemory method and the program code to detect the second user interaction includes program code to inspect a value of the second onTrimMemory method.

18. The communication device of claim 14 wherein the code to inspect includes code to determine whether the value of the onTrimMemory method is one of TRIM_MEMORY_RUNNING_MODERATE, TRIM_MEMORY_RUNNING_LOW, or TRIM_MEMORY_RUNNING_CRITICAL.

19. The communication device of claim 18 wherein the code to terminate the display is executed when the value of the onTrimMemory method is other than TRIM_MEMORY_RUNNING_MODERATE, TRIM_MEMORY_RUNNING_LOW, or TRIM_MEMORY_RUNNING_CRITICAL.

20. The communication device of claim 11 wherein the timer is configured to time out upon expiration of a predefined delay period.

* * * * *

UNITED STATES PATENT AND TRADEMARK OFFICE
CERTIFICATE OF CORRECTION

| | |
|---|---|
| PATENT NO. | : 11,736,776 B2 |
| APPLICATION NO. | : 17/079870 |
| DATED | : August 22, 2023 |
| INVENTOR(S) | : Matthew Aaron Feadler et al. |

It is certified that error appears in the above-identified patent and that said Letters Patent is hereby corrected as shown below:

In the Claims

At Column 31, Claim number 1, Line number 5:
"by displaying an overlay of an activity-hacked overlay"
Should read:
-- by displaying an overlay of an activity-backed overlay --

Signed and Sealed this
Thirtieth Day of April, 2024

Katherine Kelly Vidal
*Director of the United States Patent and Trademark Office*